US009294870B2

(12) United States Patent
Matsuda

(10) Patent No.: US 9,294,870 B2
(45) Date of Patent: Mar. 22, 2016

(54) COMMUNICATION DEVICE AND NON-TRANSITORY COMPUTER-READABLE RECORDING MEDIUM

(71) Applicant: Brother Kogyo Kabushiki Kaisha, Nagoya-shi, Aichi-ken (JP)

(72) Inventor: Munehisa Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 49 days.

(21) Appl. No.: 14/228,425

(22) Filed: Mar. 28, 2014

(65) Prior Publication Data

US 2014/0349577 A1  Nov. 27, 2014

(30) Foreign Application Priority Data

Mar. 28, 2013  (JP) .................................. 2013-068623

(51) Int. Cl.
*H04B 7/00* (2006.01)
*H04W 4/00* (2009.01)

(52) U.S. Cl.
CPC ..................................... *H04W 4/008* (2013.01)

(58) Field of Classification Search
CPC ...... H04B 5/00; H04B 5/0025; H04B 5/0031; H04B 5/0056; H04B 5/0062; H04B 5/0075; H04B 5/02; H04M 1/7253; H04M 15/723; H04M 2250/04; H04W 4/008; H04W 52/0261
USPC ........ 455/41.1, 41.2, 41.3, 343.1, 343.5, 572, 455/574
See application file for complete search history.

(56) References Cited

U.S. PATENT DOCUMENTS

| 8,855,557 | B2* | 10/2014 | Moosavi ...................... 455/41.1 |
| 8,855,563 | B2 | 10/2014 | Yamaoka et al. |
| 9,071,971 | B2* | 6/2015 | Caceres et al. |
| 2010/0022187 | A1 | 1/2010 | Ohkita |
| 2011/0230138 | A1 | 9/2011 | Ohkita |
| 2012/0164944 | A1 | 6/2012 | Yamaoka et al. |
| 2013/0084803 | A1* | 4/2013 | Hall et al. ..................... 455/41.1 |
| 2013/0260683 | A1 | 10/2013 | Suzuki et al. |
| 2014/0335784 | A1* | 11/2014 | Ozenne et al. ............... 455/41.1 |
| 2015/0188611 | A1 | 7/2015 | Tsuzuki |

FOREIGN PATENT DOCUMENTS

| JP | 2010028666 A | 2/2010 |
| JP | 2011-044092 A | 3/2011 |
| WO | 2012/004939 A1 | 1/2012 |

OTHER PUBLICATIONS

Wi-Fi Alliance Technical Committee P2P Task Group, "Wi-Fi Peer-to-Peer (P2P) Technical Specification", Version 1.1, pp. 1-159.

* cited by examiner

*Primary Examiner* — Quochien B Vuong
(74) *Attorney, Agent, or Firm* — Banner & Witcoff, Ltd.

(57) ABSTRACT

A communication device may include an NFC interface configured to perform communication by using a NFC system and a controller. The controller may include a processor and a memory storing computer-readable instructions therein. The computer-readable instructions may instruct the communication device to determine whether a state is a first state, set an operation mode to a CE mode when it is determined that the state is the first state, transmit data to one external device when the operation mode is set to the CE mode when the state of the device is the first state. Additionally or alternatively, the communication device may further be caused to set the operation mode to a first mode when it is determined that the state is not the first state, and communicate communication target data with another external device when the operation mode is set in a specified mode.

11 Claims, 10 Drawing Sheets

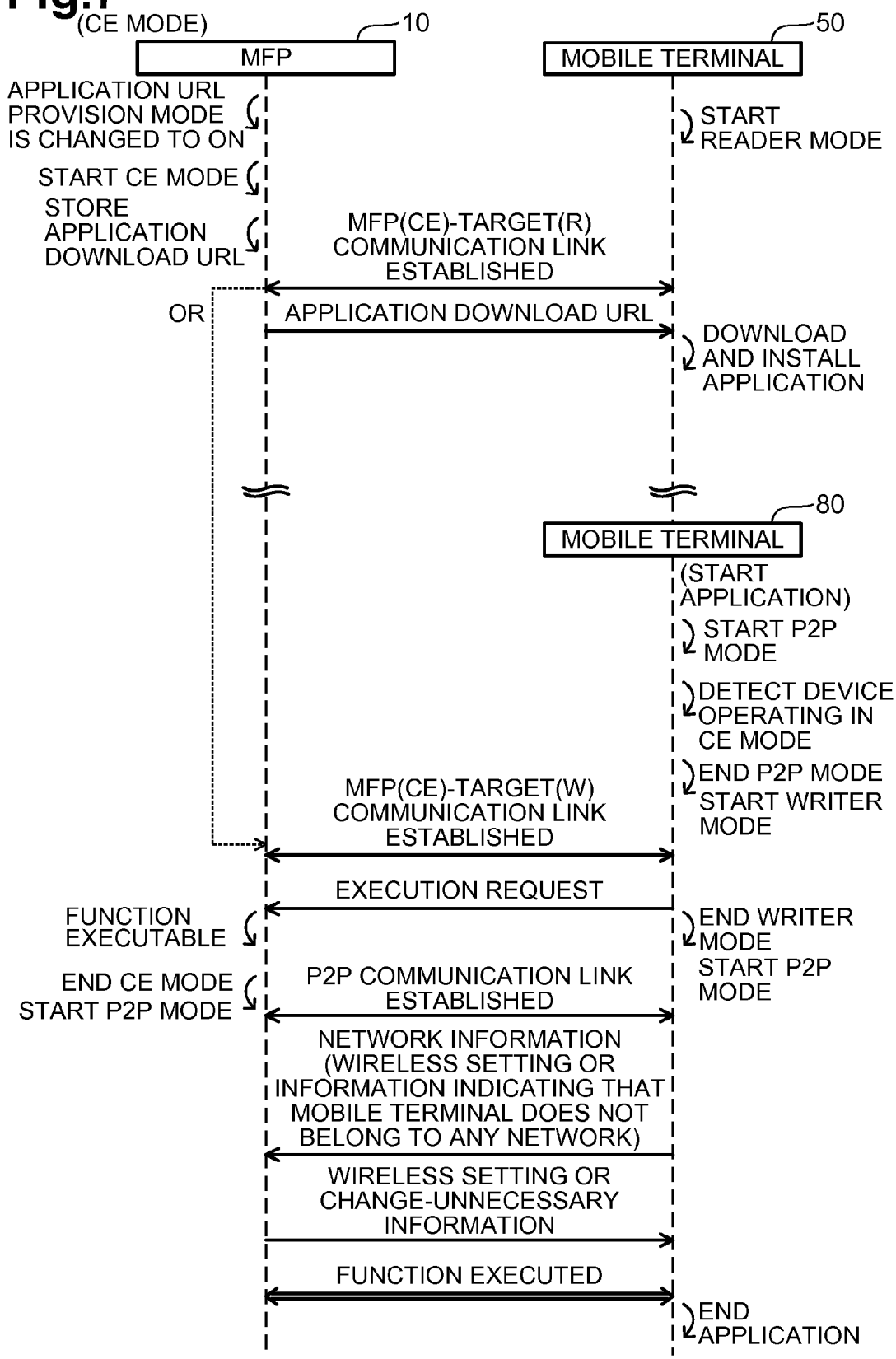

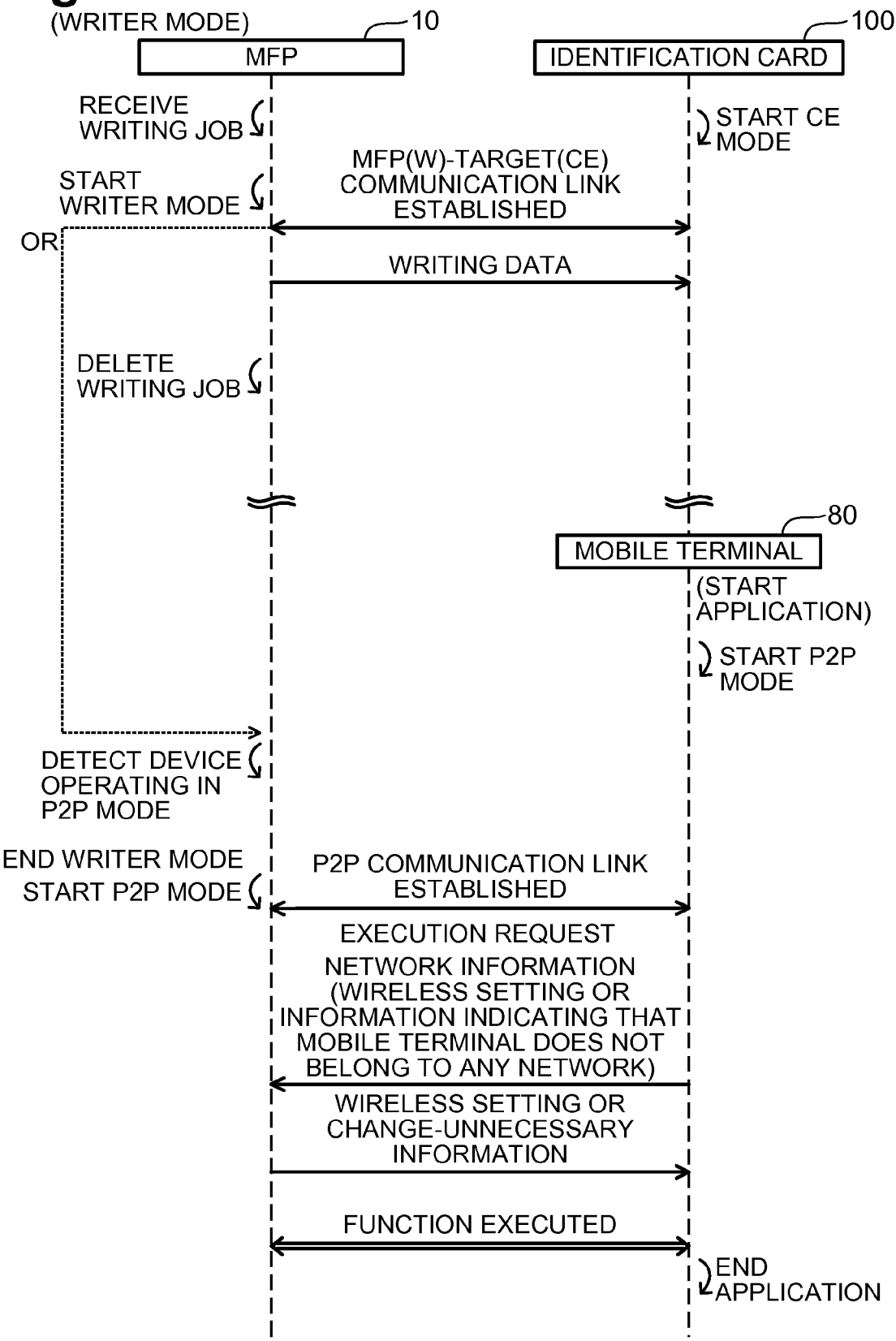

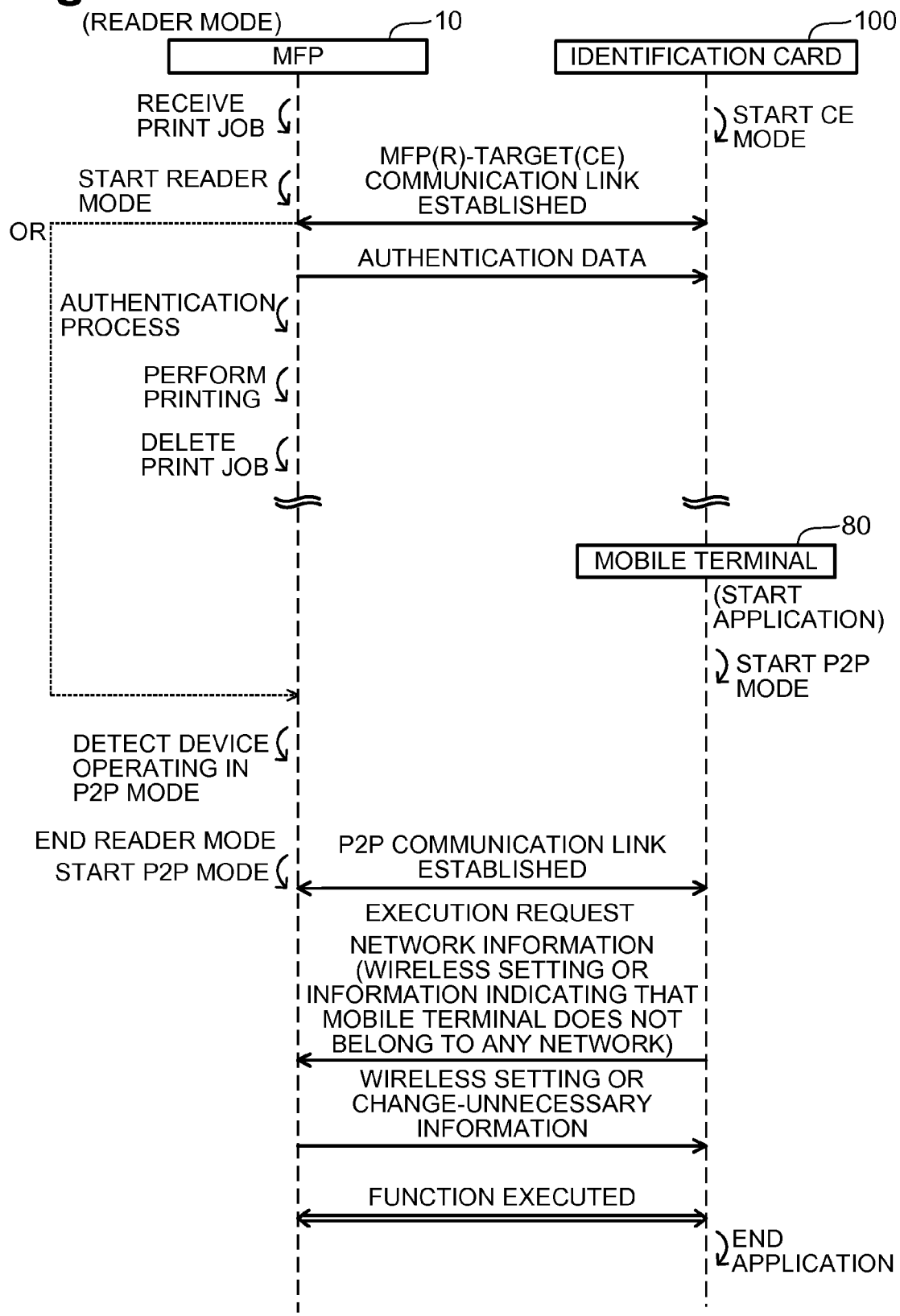

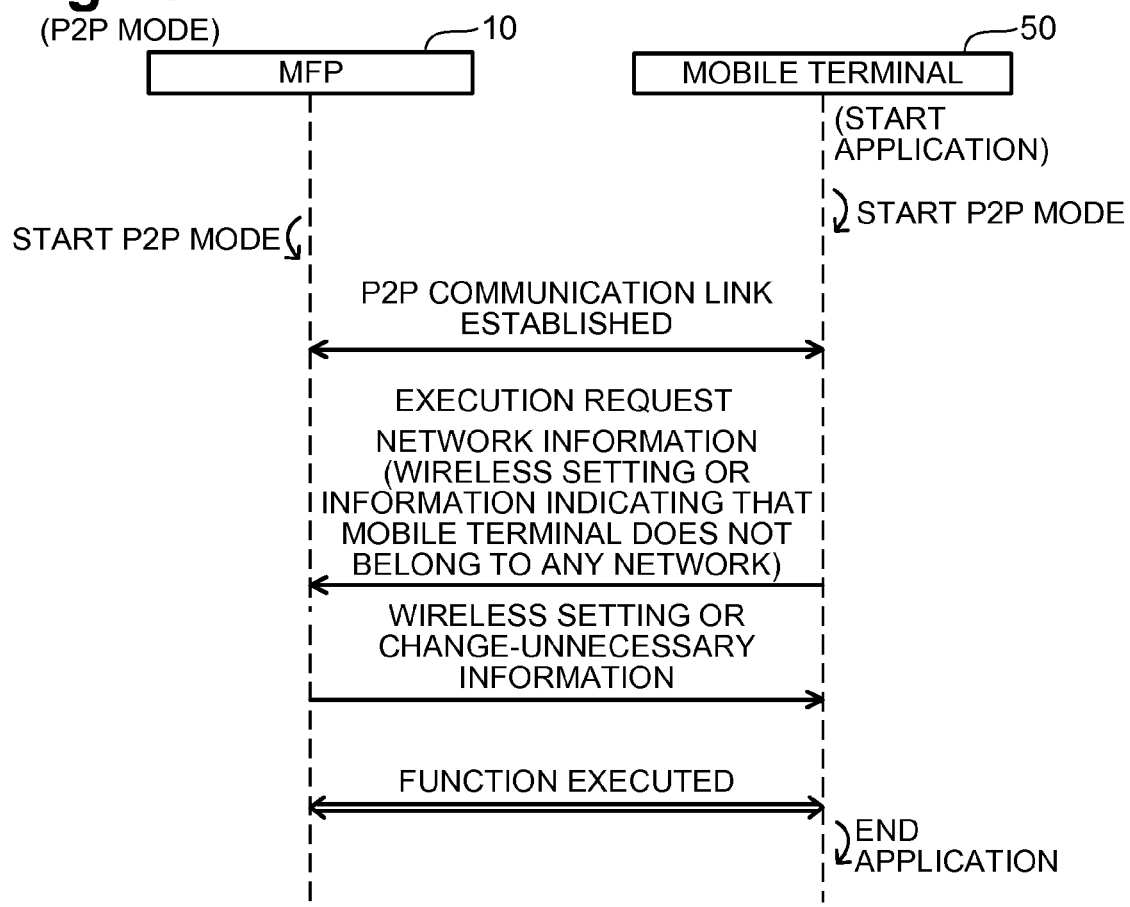

COMMUNICATION DEVICE AND NON-TRANSITORY COMPUTER-READABLE RECORDING MEDIUM

CROSS-REFERENCE TO RELATED APPLICATION

This application claims priority from Japanese Patent Application No. 2013-068623, filed on Mar. 28, 2013, the content of which is incorporated herein by reference in its entirety.

TECHNICAL FIELD

Aspects disclosed herein relate to a technique used in a communication device.

BACKGROUND

An electrical device is equipped with a short-range wireless communication device. The short-range wireless communication device automatically switches its mode between an Initiator mode and a Responder mode at a predetermined timing. The short-range wireless communication device changes a ratio between a period of operation in the Initiator mode and a period of operation in the Responder mode in accordance with a status of a power supply connected to the electrical device.

SUMMARY

There may be required a new technique for enabling an electrical device to operate appropriately in accordance with a status of the electrical device itself.

Accordingly, some embodiments provide for a new communication device that may operate appropriately in accordance with a status of the communication device itself.

According to one or more aspects of the disclosure, a communication device may include a Near Field Communication (NFC) interface configured to perform communication by using a NFC system and a controller. The NFC system may comply with an NFC standard. The controller may include a processor and a memory storing computer-readable instructions therein. The computer-readable instructions, when executed by the processor, may instruct of otherwise cause the communication device (e.g., various components thereof) to perform several various. In one example, the computer-readable instructions may instruct the communication device to determine whether a state of the communication device is a first state where particular data pre-stored in the communication device is transmitted outside of the communication device (e.g., an external destination). Additionally or alternatively, the computer-readable instructions may instruct the communication device to set an operation mode of the communication device to a Card Emulation (CE) mode of the NFC standard in a case where it is determined that the state of the communication device is the first state. The computer-readable instructions may further instruct the communication device to transmit the particular data to a first external device by using a first type of communication link in a case where the first type of communication link is established between the communication device and the first external device in a state where the communication device is in the CE mode. The first type of communication link may correspond to a communication link through which data communication is performed by using the NFC interface when the communication device operates in the CE mode and the first external device operates in a Reader mode of the NFC standard. The computer-readable instructions may instruct the communication device to set the operation mode of the communication device to a first mode of the NFC standard that differs from the CE mode in a case where it is determined that the state of the communication device is not the first state. The computer-readable instructions may instruct the communication device to perform communication of communication target data that differs from the particular data with a second external device by using a second type of communication link in a case where the second type of communication link is established between the communication device and the second external device in a state where the operation mode of the communication device is set to the first mode. The second type of communication link is a communication link through which data communication is performed by using the NFC interface when the communication device operates in the first mode and the second external device operates in a second mode of the NEC standard.

According to the above-described configuration, the communication device may be configured to determine whether the communication device is in the first state where the communication device needs to transmit the particular data. Accordingly, the communication device may be configured to operate in an appropriate operation mode (e.g., one of the CE mode and the first mode) in accordance with whether the communication device is in the first state. Thus, the communication device may be configured to perform appropriate communication with one of the first and second external devices in accordance with the operation mode of the communication device. Additionally, the communication device may be configured to operate appropriately in accordance with the state of the communication device.

Control methods and computer programs for implementing the above-described communication device, computer programs, and computer-readable storage media storing the computer programs may also have novelty and utility. Communication systems including the above-described communication device and at least one of a plurality of external devices may also have novelty and utility.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 7 is a sequence diagram depicting communication performed between devices when the MFP operates in a CE mode in the illustrative embodiment according to one or more aspects of the disclosure.

FIG. 8 is a sequence diagram depicting communication performed between devices when the MFP operates in a Writer mode in the illustrative embodiment according to one or more aspects of the disclosure.

FIG. 9 is a sequence diagram depicting communication performed between devices when the MFP operates in a Reader mode in the illustrative embodiment according to one or more aspects of the disclosure.

FIG. 10 is a sequence diagram depicting communication performed between devices when the MFP operates in a P2P mode in the illustrative embodiment according to one or more aspects of the disclosure.

DETAILED DESCRIPTION

Figure 1:
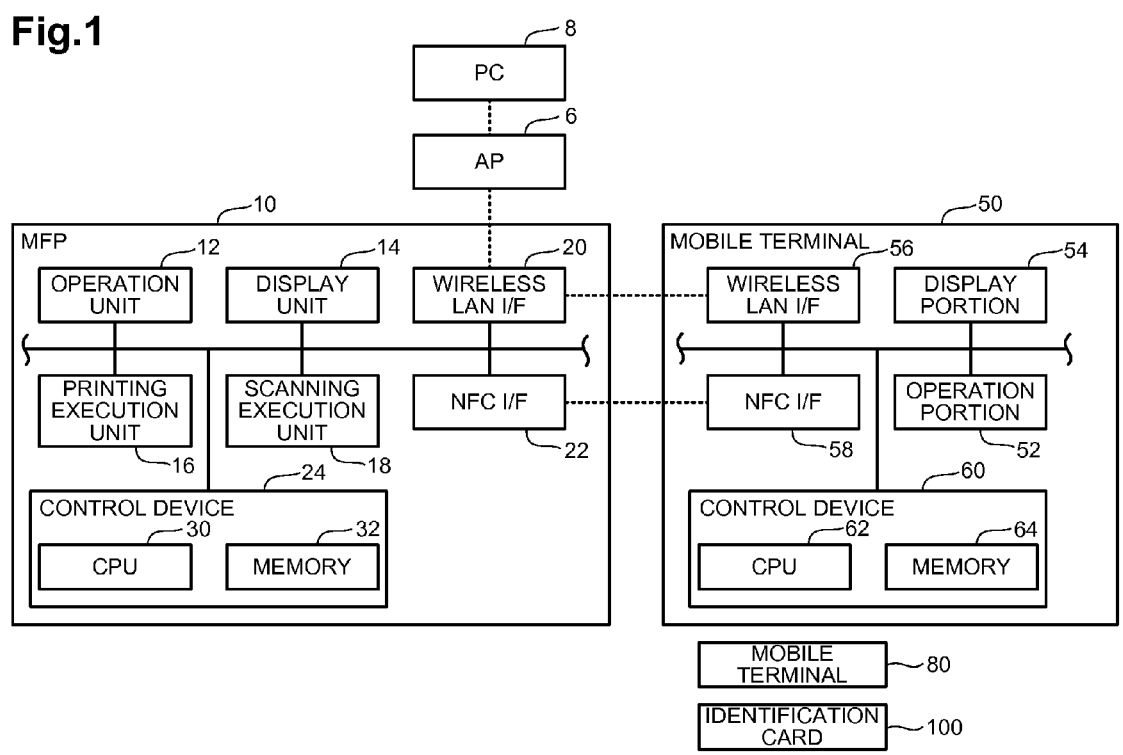
FIG. 1 illustrates a configuration of a communication system in an illustrative embodiment according to one or more aspects of the disclosure.

Hereinafter, an illustrative embodiment will be described with reference to the accompanying drawings. Referring to FIG. 1, an example configuration of a communication system 2 will be described. The communication system 2 includes an access point ("AP") 6, a personal computer ("PC") 8, a multifunction peripheral ("MFP") 10, mobile terminals 50 and 80, and an identification card 100. Each of the MFP 10, the mobile terminals 50 and 80, and the identification card 100 is configured to perform communication using a communication system that complies with a Near Field Communication ("NFC") standard (i.e., an NFC system). Short-range wireless communication may include wireless communication in compliance with the NFC system. In this illustrative embodiment, wireless communication using the NFC system is performed in compliance with the International standard, e.g., ISO/IEC 21481 or ISO/IEC 18092.

Each of the PC 8, the MFP 10, and the mobile terminals 50 and 80 is configured to perform wireless communication using a system in compliance with a Wi-Fi Direct (hereinafter, referred to as a "WFD system"). In the WFD system, wireless communication is performed in compliance with the standard IEEE (The Institute of Electrical and Electronics Engineers, Inc.) 802.11 and its family standards (e.g., 802.11a, 802.11b, 802.11g, and 802.11n). A communication method (i.e., the standards for wireless communication) differs between the NFC system and the WFD system. For example, the communication method of the WFD system has a higher communication speed than the communication method of the communication speed of the NFC system.

For example, a WFD network may be configured by establishment of a connection (hereinafter, referred to as a "WFD connection") between the MFP 10 and the mobile terminal 50 using the WFD system. Likewise, another WFD network may be configured by establishment of a WFD connection between the MFP 10 and the PC 8.

The PC 8, the MFP 10, and the mobile terminals 50 and 80 are further configured to perform wireless communication using a basic Wi-Fi system that differs from wireless communication using the WFD system. In one example, wireless communication using the basic Wi-Fi system may be wireless communication using the AP 6, and wireless communication using the WFD system may be wireless communication without using the AP 6. For example, the MFP 10 is allowed to belong to a basic Wi-Fi network by establishment of a connection between the MFP 10 and the AP 6 (hereinafter, referred to as a "basic Wi-Fi connection") in accordance with the basic Wi-Fi system. The MFP 10 is allowed to perform wireless communication with another device (e.g., the PC 8 or the mobile terminal 50) that belongs in the basic Wi-Fi network, via the AP 6. A communication method (i.e., the standards for wireless communication) differs between the NFC system and the basic Wi-Fi system. For example, the communication method of the basic Wi-Fi system may have a higher communication speed than the communication method of the communication speed of the NFC system.

Referring to FIG. 1, a configuration of the MFP 10 will be described. The MFP 10 includes an operation unit 12, a display unit 14, a printing execution unit 16, a scanning execution unit 18, a wireless LAN interface ("I/F") 20, an NFC interface ("I/F") 22, and a control device 24. The operation unit 12 includes a plurality of keys. The user is allowed to input various instructions into the MFP 10 by operating the operation unit 12. The display unit 14 includes a display that is configured to display various information thereon. The printing execution unit 16 includes a printing mechanism using one of an inkjet method and a laser method. The scanning execution unit 18 includes a scanning mechanism using one of a charge-coupled device ("CCD") and a contact image sensor ("CIS").

The wireless LAN I/F 20 is configured to allow the control device 24 to perform one of wireless communication using the WFD system and wireless communication using the basic Wi-Fi system. The wireless LAN I/F 20 includes a single interface physically. Nevertheless, the wireless LAN I/F 20 is assigned with a media access control ("MAC") address used in wireless communication using the WFD system (hereinafter, referred to as a "MAC address for WFD system") and a MAC address used in wireless communication using the basic Wi-Fi system (hereinafter, "MAC address for basic Wi-Fi system"). More specifically, the MAC address for basic Wi-Fi system is assigned to the wireless LAN I/F 20 in advance. The control device 24 generates the MAC address for WFD system, using the MAC address for basic Wi-Fi system, and assigns the generated MAC address for WFD system to the wireless LAN I/F 20. In some arrangements, the MAC address for WFD system differs from the MAC address for basic Wi-Fi system. Therefore, the control device 24 is capable of performing both wireless communication using the WFD system and wireless communication using the basic Wi-Fi system simultaneously via the wireless LAN I/F 20. Consequently, there occurs a situation in which the MFP 10 belongs in both the WFD network and the basic Wi-Fi network at the same time. In other embodiments, for example, physically independent chips may be used as the interface configured to perform wireless communication using the WFD system and the interface configured to perform wireless communication using the basic Wi-Fi system.

The user is allowed to change a setting of the wireless LAN I/F 20 by operating the operation unit 12. The setting of the wireless LAN I/F 20 is switched between a setting that wireless communication using the WFD system is available (hereinafter, this setting is referred to as "the WFD I/F setting indicates "ON"") and a setting that wireless communication using the WFD system is unavailable (hereinafter, this setting is referred to as "the WFD I/F setting indicates "OFF""). A central processing unit ("CPU") 30 stores a value indicating a detail (e.g., "ON" or "OFF") of the WFD I/F setting designated by the user in a memory 32.

The NFC I/F 22 is configured to allow the control device 24 to perform wireless communication using the NFC system. The wireless LAN I/F 20 and the NFC I/F 22 are implemented by physically independent chips.

A communication speed (e.g., a maximum communication speed is 11 to 600 Mbps) of wireless communication via the wireless LAN I/F 20 may be faster than a communication speed (e.g., a maximum communication speed is 106 to 424 kbps) of wireless communication using the NFC I/F 22. A frequency (e.g., 2.4 GHz band or 5.0 GHz band) of a carrier in wireless communication using the wireless LAN I/F 20 may also differ from a frequency (e.g., 13.56 MHz band) of a carrier in wireless communication using the NFC I/F 22. The CPU 30 is allowed to perform wireless communication using the NFC system between the MFP 10 and one of the mobile terminals 50 and 80 via the NFC I/F 22 in a situation where a distance between the MFP 10 and the one of the mobile terminals 50 and 80 is shorter than approximately 10 cm. The CPU 30 is allowed to perform wireless communication using one of the WFD system and the basic Wi-Fi system, between the MFP 10 and one of the mobile terminals 50 and 80 via the wireless LAN I/F 20, in a situation where the distance between the MFP 10 and the one of the mobile terminals 50 and 80 is longer than, shorter than or equal to approximately 10 cm (e.g., a maximum communicable distance is approximately 100 m). That is, a maximum distance that the MFP 10 can communicate with a communication target device (e.g., the mobile terminal 50) wirelessly via the wireless LAN I/F 20 is longer than a maximum distance that the MFP 10 can communicate with the communication target device wirelessly via the NFC I/F 22.

The control device 24 includes the CPU 30 and the memory 32. The CPU 30 performs various processes in accordance with a program (e.g., instructions) stored in the memory 32. The memory 32 includes a read-only memory ("ROM"), a random-access memory ("RAM"), and a hard disk. The memory 32 stores the above-described program to be executed by the CPU 30.

According to some configurations, the program may include an application program and a protocol stack. The application program is designed to enable the CPU 30 to perform a process at an application layer in an Open System Interconnection ("OSI") reference model. The protocol stack is designed to enable the CPU 30 to perform a process at a lower layer underlying the application layer in the OSI reference model. The protocol stack includes a Peer-to-Peer ("P2P") program, an R/W program, and a CE program. The P2P program is a program for performing a process in accordance with a P2P mode of the NFC standard. The R/W program is a program for performing a process in accordance with a Reader/Writer mode of the NFC standard. The CE program is a program for performing a process in accordance with a Card Emulation ("CE") mode of the NFC standard. These programs are programs for performing processes that comply with the NFC standard specified by the NFC Forum.

When the MFP 10 belongs to the WFD network, the CPU 30 stores, in the memory 32, information indicating that the MFP 10 belongs to the WFD network and a wireless setting (e.g., an authentication method, an encryption method, a password, a service set identifier ("SSID") of the wireless network, and a basic service set identifier ("BSSID")) for performing communication of target data (e.g., print data or scan data) via the WFD network. When the MFP 10 belongs to the basic Wi-Fi network, the CPU 30 stores, in the memory 32, information indicating that the MFP 10 belongs to the basic Wi-Fi network and a wireless setting for performing communication of target data via the basic Wi-Fi network. The SSID is an identifier for identifying a wireless network. The BSSID is a unique identifier (e.g., a MAC address) of an access point that configures a wireless network (e.g., a device having a group owner ("G/O") status in the WFD network).

The memory 32 stores the value indicating the detail (e.g., "ON" or "OFF") of the WFD I/F setting therein. In some examples, the control device 24 is not allowed to perform various processes in accordance with the WFD system in a state where the WFD I/F setting stored in the memory 32 indicates "OFF". In a state where the WFD I/F setting indicates "ON", the memory 32 further stores a WFD-system-related value indicating a current status (e.g., a G/O status, a client status, or a device status) of the MFP 10.

The memory 32 further stores an URL (hereinafter, referred to as an "application download URL") for allowing another device (e.g., the mobile terminal 50) to download an application program (hereinafter, referred to as an "application for MFP") that enables the other device to perform various functions (e.g., one or more of the printing function and the scanning function) using the MFP 10. The memory 32 further stores an URL of a webpage that describes how to resolve a device error (e.g., a paper jam or a breakdown of a printing mechanism occurring in the printing execution unit 16) that may occur in the MFP 10 (hereinafter, referred to as a "support page URL"). The device error will be described in further detail below. The memory 32 further stores a URL of a webpage for introducing consumable items (e.g., ink (toner), and sheets) that may be used in the MFP 10 (hereinafter, referred to as a "consumable item URL"). The application download URL, the support page URL, and the consumable item URL may be pre-stored in the memory 32 by a vendor of the MFP 10.

The memory 32 further stores a value indicating a detail (e.g., "ON" or "OFF") of an application URL provision mode setting. The "application URL provision mode" enables the MFP 10 to provide another terminal with the above-described application download URL. The user is allowed to switch the setting of the application URL provision mode between "ON" and "OFF" by operating the operation unit 12. The CPU 30 stores, in the memory 32, the value indicating the detail (e.g., "ON" or "OFF") of the application URL provision mode setting designated by the user.

The memory 32 is further configured to store a writing job therein. When the CPU 30 receives a writing job from the PC 8 via the AP 6, the CPU 30 stores the writing job in the memory 32. The writing job includes writing data designated by the user (e.g., a URL designated by the user and/or text inputted by the user). The memory 32 is further configured to store a print job therein. When the CPU 30 receives a print job from the PC 8 via the AP 6, the CPU 30 stores the print job in the memory 32. The print job includes print data desired to be printed, e.g., by the user. In the illustrative embodiment, authentication using the identification card 100 is required in order for the MFP 10 to perform printing based on the print data.

Next, communication using the NFC system will be further described. Hereinafter, a device that is capable of performing communication using the NFC system (e.g., the MFP 10, the mobile terminals 50 and 80, and the identification card 100) is referred to as an "NFC-enabled device". Hereinafter, a Reader mode and a Writer mode are referred to as an "R/W mode".

Among NFC-enabled devices, there is a device in which all the three modes of the P2P mode, the R/W mode, and the CE mode are available and another device in which one or two of the three modes are available. In the illustrative embodiment, all of the above-described three modes are available in each of the MFP 10 and the mobile terminals 50 and 80. The identification card 100 is designed to comply with the NFC standard (also referred to as an "NFC-compliant card"). More specifically, the CE mode is available but the P2P mode and the R/W mode are not available in the identification card 100.

The P2P mode provides two-way communication between NFC-enabled devices in a pair. It is assumed that the P2P mode is active in both of a first NFC-enabled device and a second NFC-enabled device. In this case, a communication link appropriate for the P2P mode (hereinafter, referred to as a "P2P communication link") is established between the first NFC-enabled device and the second NFC-enabled device. Under this situation, for example, the first NFC-enabled device transmits first predetermined data to the second NFC-enabled device via the P2P communication link. Then, the second NFC-enabled device transmits second predetermined data to the first NFC-enabled device via the same P2P communication link. Thus, two-way communication is implemented. An NFC-enabled device that is compliant with ISO/IEC 1443 Type A defined by the NFC Forum and an NFC-enabled device that is compliant with ISO/IEC 18092 Type F defined by the NFC Forum are both capable of using the P2P mode. Nevertheless, an NFC-enabled device that is compliant with ISO/IEC 1443 Type B defined by the NFC Forum is not capable of using the P2P mode.

The R/W mode and the CE mode both provide one-way communication between NFC-enabled devices in a pair. The CE mode enables an NFC-enabled device to operate as a "card" in a form defined by the NFC Forum. The NFC-enabled device of Type A, the NFC-enabled device of Type F, and the NFC-enabled device of Type B are capable of using the CE mode. The Reader mode enables an NFC-enabled device to read data from another NFC-enabled device that operates in the CE mode as a card. The Writer mode enables an NFC-enabled device to write data in another NFC-enabled device that operates in the CE mode as a card. The Reader mode also enables an NFC-enabled device to read data from an NFC-compliant card (e.g., the identification card 100). The Writer mode also enables an NFC-enabled device to write data in the NFC-compliant card.

For example, in one scenario, the Reader mode is active in the first NFC-enabled device and the CE mode is active in the second NFC-enabled device. In this case, a communication link appropriate for the Reader mode and the CE mode is established between the first NFC-enabled device and the second NFC-enabled device. Under this situation, the first NFC-enabled device performs an operation for reading data from a pseudo card in the second NFC-enabled device via the communication link to receive the data from the second NFC-enabled device.

In another example, if the Writer mode is active in the first NFC-enabled device and the CE mode is active in the second NFC-enabled device, a communication link appropriate for the Writer mode and the CE mode is established between the first NFC-enabled device and the second NFC-enabled device. Under this situation, the first NFC-enabled device performs an operation for writing data into the pseudo card in the second NFC-enabled device via the communication link to transmit the data to the second NFC-enabled device.

As described above, various combinations of the modes are available to perform communication using the NFC system between NFC-enabled devices in a pair. For example, for the combinations of the modes in the pair of NFC-enabled devices, the following five patterns are available: a "P2P mode and P2P mode" pair, a "Reader mode and CE mode" pair, a "Writer mode and CE mode" pair, a "CE mode and Reader mode" pair, and a "CE mode and Writer mode" pair.

An NFC-enabled device cannot create a situation in which both the Reader mode and the Writer mode are active simultaneously. That is, while the Reader mode is active, the Writer mode is inactive in the NFC-enabled device. While the Writer mode is active, the Reader mode is in inactive in the NFC-enabled device.

The NFC-enabled devices are configured to establish therebetween a communication link appropriate for an active mode but not configured to establish therebetween a communication link appropriate for an inactive mode. For example, when the CE mode is active and the P2P mode and the R/W mode are inactive in the MFP 10, the MFP 10 is allowed to establish a communication link for enabling the MFP 10 to operate in the CE mode. Nevertheless, the MFP 10 is not allowed to establish another communication link (e.g., a communication link for enabling the MFP 10 to operate in the inactive P2P mode, the inactive Reader mode, or the inactive Writer mode).

Next, the WFD will be described. The WFD is a standard created by the Wi-Fi Alliance and is specified in the "Wi-Fi Peer-to-Peer (P2P) Technical Specification Version 1.1" drafted by the Wi-Fi Alliance.

As described above, the PC 8, the MFP 10, and the mobile terminals 50 and 80 are configured to perform thereamong wireless communication using the WFD system. Hereinafter, a device that is capable of performing wireless communication in compliance with the WFD system is referred to as a "WFD-enabled device". The WFD standard defines three statuses of the WFD-enabled device: a G/O status, a client status, and a device status. The WFD-enabled device is configured to operate selectively in one of the three statuses.

A wireless network is configured by a device having the G/O status (hereinafter, also referred to as a "G/O-status device") and one or more devices having the client status (hereinafter, also referred to as a "client-status device"). In a wireless network, one or more client-status devices are present while only one G/O-status device is present. The G/O-status device is configured to control the one or more client-status devices. More specifically, the G/O-status device is configured to generate a management list that describes identifying information (e.g., a media access control ("MAC") address) of the one or more client-status devices. When a new client-status device participates in the wireless network, the G/O-status device adds identifying information of the new client-status device on the management list. When one of the one or more client-status devices leaves the wireless network, the G/O-status device erases the identifying information of the departing or departed client-status device.

The G/O-status device is configured to perform wireless communication of target data (e.g., data including information on a network layer of the OSI reference model (e.g., print data or scan data)) with one of the one or more devices that are listed in the management list, such as one of the one or more client-status devices (e.g., one or more devices belonging to the WFD network). The G/O-status device is configured to not perform wireless communication of the target data with a client-status device that is not listed in the management list. The G/O-status device, however, is configured to perform wireless communication of data for participating in the wireless network (e.g., data not including the information on the network layer such as a Probe Request packet or data of a physical layer of a Probe Response packet) with the unlisted client-status device. For example, the MFP 10 having G/O status is allowed to receive print data via wireless communication from the mobile terminal 50 (e.g., the mobile terminal 50 having client status) listed in the management list but is not allowed to receive print data via wireless communication from a device not listed in the management list.

The G/O-status device is configured to serve as a relay station configured to relay wireless communication between a plurality of the client-status devices that transmit target data (e.g., print data or scan data) therebetween. For example, when the mobile terminal 50 having the client status transmits print data via wireless communication to another printer having the client status, the mobile terminal 50 transmits the print data via wireless communication to the MFP 10 having the G/O status first and the MFP 10 then transmits the print data via wireless communication to the printer having the client status. That is, the G/O-status device is configured to function as the AP in the basic WFD network.

The WFD-enabled device that is absent from the wireless network (e.g., a WFD-enabled device not listed in the management list) is a device having the device status (hereinafter, also referred to as a "device-status device"). The device-status device is configured to perform wireless communication of the data for participating in the WFD network (e.g., a Probe Request packet or data of a physical layer of a Probe Response packet) with the G/O-status device but is not allowed to perform wireless communication of target data (e.g., print data or scan data) with the G/O-status device via the WFD network.

Next, configurations of the mobile terminals 50 and 80 will be further described with reference to FIG. 1. The mobile terminal 50 may include a mobile phone (e.g., smartphone), a personal digital assistant ("PDA"), a notebook PC, a tablet PC, a mobile music player, and/or a mobile video player. The mobile terminal 80 may have the same configuration as the mobile terminal 50. The mobile terminal 50 includes an operation unit 52, a display unit 54, a wireless LAN interface ("I/F") 56, an NFC interface ("I/F") 58, and a control device 60. The operation unit 52 includes a plurality of keys. The display unit 54 includes a display configured to display various information thereon. In other embodiments, for example, the mobile terminal 50 may include a touch panel having functions of both the operation unit 52 and the display unit 54.

The wireless LAN I/F 56 and the NFC I/F 58 have the same configuration as the wireless LAN I/F 20 and the NFC I/F 22, respectively, of the MFP 10. That is, the control device 60 is allowed to perform wireless communication using the WFD system and wireless communication using the basic Wi-Fi system via the wireless LAN I/F 56 simultaneously. The control device 60 is also allowed to perform wireless communication using the NFC system via the NFC I/F 58.

The control device 60 includes a CPU 62 and a memory 64. The CPU 62 is configured to perform various processes in accordance with a program stored in the memory 64. The memory 64 includes a ROM, a RAM, and a hard disk. The memory 64 stores the above program that is executed by the CPU 62. The program includes an application program and a protocol stack, similar to the program stored in the memory 32 of the MFP 10. The application program includes an application program that is designed to enable the MFP 10 to perform various functions (e.g., a printing function and/or a scanning function) (hereinafter, referred to as an "application for MFP"). As described below with reference to FIG. 7, upon receipt of an application download URL from the MFP 10, the CPU 62 accesses an Internet server (not depicted) offered by the vendor of the MFP 10, using the application download URL. Then, the CPU 62 downloads and installs the application for MFP in the memory 64 from the server.

The memory 64 stores a first operation system ("OS") program. The first OS program enables the mobile terminal 50 to operate as described below. For example, as power of the mobile terminal 50 is turned on, the mobile terminal 50 enters in an initial status in which the Reader mode is active and the other modes are inactive. In a case where the application for MFP has not yet been installed on the mobile terminal 50, the mobile terminal 50 maintains the initial status. In a case where the application for MFP was installed on the mobile terminal 50 but has not been started yet, the mobile terminal 50 also maintains the initial status. As the application for MFP starts, the mobile terminal 50 changes from the initial status to a status in which the P2P mode is active and the other modes (e.g., the R/W mode and the CE mode) are inactive.

A configuration of the identification card 100 will be described below. The identification card 100 is provided to the user of the PC 8. As described above, the identification card 100 is an NFC-compliant card, and the CE mode is available while the P2P mode and the R/W mode are not available in the identification card 100. In the communication system 2 according to the illustrative embodiment, when the MFP 10 belongs to a wireless network including the AP 6 and the PC 8, the MFP 10 receives a print job from the PC 8 via the AP 6 in some cases. The print job includes print data. Even when the MFP 10 receives the print job from the PC 6, the MFP 10 does not start printing until authentication using the identification card 100 succeeds. The identification card 100 stores authentication data (e.g., a user ID and a password) used for authentication performed in the MFP 10. Referring to FIG. 9, the user of the PC 8 brings the identification card 100 closer to the MFP 10 after the user transmits a print job from the PC 8 to the MFP 10. The MFP 10 receives the authentication data (e.g., the user ID and the password) from the identification card 100 to perform an authentication process. In response to successful authentication, the MFP 10 starts printing. Thus, the user of the PC 8 may obtain a printed matter while the user is present near the MFP 10. Printing in this manner may reduce a risk that a third party takes the printed matter away from the MFP 10.

Next, a Polling operation and a Listen operation performed by an NFC-enabled device are described. For example, in the MFP 10, the NFC I/F 22 performs the Polling operation and the Listen operation in accordance with the program. In the Polling operation, the NFC I/F 22 transmits a polling signal and receives a response signal transmitted in response to the polling signal. In the Listen operation, the NFC I/F 22 receives a polling signal and transmits a response signal in response to the polling signal.

The NFC I/F 22 of the MFP 10 is configured to operate selectively in one of a Polling mode of performing the Polling operation, a Listen mode of performing the Listen operation, and a mode of performing none of the Polling operation and the Listen operation (hereinafter, referred to as a "nonperformance mode"). The NFC I/F 22 operates in one of the Polling mode, the Listen mode, and the nonperformance mode selectively in turn. For example, the NFC I/F 22 may perform a one-cycle operation in which the NFC I/F 22 operates in the Polling mode first, and then operates in the Listen mode, and finally operates in the nonperformance mode. The NFC I/F 22 may perform the one-cycle operation repeatedly.

In the Polling mode, the NFC I/F 22 transmits a polling signal and then monitors receipt of a response signal. More specifically, the NFC I/F 22 (1) transmits a polling signal to which an NFC-enabled device of Type A can respond (e.g., a polling signal for Type A) and monitors receipt of a response signal for a predetermined time period, (2) if a response signal has not been received, transmits a polling signal to which an NFC-enabled device of Type B can respond (e.g., a polling signal for Type B) and monitors receipt of a response signal for a predetermined time period, (3) if a response signal has not been received, transmits a polling signal to which an NFC-enabled device of Type F can respond (e.g., a polling signal for Type F) and monitors receipt of a response signal for a predetermined time period. The NFC I/F 22 repeats the above operation. When the NFC I/F 22 receives a response signal from an NFC-enabled device (i.e., a communication target) within the predetermined time period in one of the steps in the above operation, the communication target is determined as an NFC-enabled device of Type that corresponds to the polling signal that the NFC-enabled device receives immediately before transmitting the response signal. When the NFC I/F 22 receives a response signal from a communication target, the NFC I/F 22 further transmits, to the communication target, an inquiry signal to inquire which of the modes is active in the NFC-enabled device that transmitted the response signal.

In the Listen mode, the NFC I/F 22 monitors receipt of a polling signal. Upon receipt of a polling signal, the NFC I/F 22 transmits a response signal. The NFC I/F 22 transmits a response signal to an NFC-enabled device (e.g., a communication target) that is a sender of the polling signal only when the NFC I/F 22 receives the polling signal for the type corresponding to the NFC I/F 22. When the NFC I/F 22 transmits the response signal to the communication target, the NFC I/F 22 further receives the inquiry signal from the communication target. Thus, the NFC I/F 22 transmits an active mode signal to the communication target.

In the nonperformance mode, the NFC I/F 22 does not transmit either a polling signal or a response signal even when the NFC I/F 22 receives a polling signal.

The mobile terminals 50 and 80 also repeatedly perform the one-cycle operation independently. Therefore, for example, when a period during which the NFC I/F 22 of the MFP 10 operates in the Polling mode overlaps a period during which the mobile terminal 50 operates in the Listen mode while the distance between the MFP 10 and the mobile terminal 50 is shorter than 10 cm, the NFC I/F 22 performs the Polling operation of transmitting a polling signal to the mobile terminal 50 and receiving a response signal from the mobile terminal 50. For example, when a period during which the NFC I/F 22 of the MFP 10 operates in the Listen mode overlaps a period during which the mobile terminal 50 operates in the Polling mode while the distance between the MFP 10 and the mobile terminal 50 is shorter than 10 cm, the NFC I/F 22 performs the Listen operation of receiving a polling signal from the mobile terminal 50 and transmitting a response signal to the mobile terminal 50. Hereinafter, an NFC-enabled device that performs the Polling operation is referred to as a "Polling device" and an NFC-enabled device that performs the Listen operation is referred to as a "Listen device".

When the NFC I/F 22 performs the Polling operation, that is, when the MFP 10 is a Polling device, subsequent processes to be performed for communication are carried on by the CPU 30. More specifically, first, the NFC I/F 22 passes, to the CPU 30, the information indicating which one of the modes that a communication target serving as a Listen device (e.g., the mobile terminal 50) can operate in (e.g., the information indicated by the received active mode signal).

For example, in a case where the MFP 10 serving as a Polling device is currently in a state where the P2P mode is active and the CE mode and the R/W mode are inactive and the information passed from the NFC I/F 22 indicates that the communication target serving as a Listen device is currently in a state where the P2P mode is active, the CPU 30 transmits an Activation command corresponding to the P2P mode to the communication target and then receives an OK command from the communication target. Thus, a P2P communication link is established between the MFP 10 serving as a Polling device and the communication target serving as a Listen device.

In another example, in a case where the MFP 10 serving as a Listen device is currently in a state where the P2P mode is active and the CE mode is inactive and the communication target serving as a Polling device is currently in a state where the P2P mode is active, the CPU 30 receives an Activation command corresponding to the P2P mode from the communication target. In this case, the CPU 30 determines that the MFP 10 needs to operate in the P2P mode, and transmits an OK command to the communication target. Thus, a P2P communication link is established between the MFP 10 serving as a Listen device and the communication target serving as a Polling device.

In still another example, in a case where the MFP 10 serving as a Listen device is currently in a state where the CE mode is active and the P2P mode is inactive and the communication target serving as a Polling device is currently in a state where one of the Reader mode and the Writer mode is active, the CPU 32 receives an Activation command corresponding to the R/W mode from the communication target. In this case, the CPU 32 determines that the MFP 10 needs to operate in the CE mode, and transmits an OK command to the communication target. Thus, a communication link appropriate for the CE mode and the R/W mode is established between the MFP 10 serving as a Listen device and the communication target serving as a Polling device.

In a case where the communication link appropriate for the CE mode and the R/W mode is established, the CPU 32 further receives, from the communication target, information indicating which one of the Reader mode and the Writer mode that the communication target operates in. Therefore, for example, when the CPU 32 receives information indicating that the communication target operates in the Reader mode, a communication link appropriate for the CE mode and the Reader mode (hereinafter, referred to as an "MFP(CE)-target (R) communication link") is established between the MFP 10 serving as a Listen device and the communication target serving as a Polling device. For another example, when the CPU 32 receives information that the communication target operates in the Writer mode, a communication link appropriate for the CE mode and the Writer mode (hereinafter, referred to as an "MFP(CE)-target(W) communication link") is established between the MFP 10 serving as a Listen device and the communication target serving as a Polling device.

In yet another example, in a case where the MFP 10 serving as a Polling device is currently in a state where the Writer mode is active and the other modes are inactive and the information passed from the NFC I/F 22 indicates that the communication target serving as the Listen device is currently in a state where the P2P mode is active, a communication link is not be established between the MFP 10 serving as a Polling device and the communication target serving as a Listen device. Nevertheless, in this case, the CPU 30 detects that the P2P mode is active in the communication target (e.g., YES in step S76 in FIG. 4).

Likewise, in a case where the MFP 10 serving as a Polling device is currently in a state where the Reader mode is active and the other modes are inactive and the information passed from the NFC I/F 22 indicates that the communication target serving as a Listen device is currently in a state where the P2P mode is active, a communication link is not established between the MFP 10 serving as a Polling device and the communication target serving as a Listen device. Nevertheless, in this case, also, the CPU 30 detects that the P2P mode is active in the communication target (e.g., YES in step S98 in FIG. 5).

The PC 8 includes a wireless LAN I/F (e.g., an interface for WFD system and basic Wi-Fi system) but does not include an NFC I/F. Therefore, the PC 8 is allowed to perform communication with the MFP 10 via the wireless LAN but is not allowed to perform wireless communication using the NFC system. The PC 8 includes a driver program that enables the MFP 10 to perform one or more functions (e.g., a printing function and/or a scanning function). Normally, the driver program is installed on the PC 8 using a medium shipped with the MFP 10. Nevertheless, in other embodiments, for example, the driver program may be installed on the PC 8 from a server offered by the vendor of the MFP 10.

The AP 6 is not a G/O-status device in the WFD system. The AP 6 is a common AP, e.g., called a wireless access point or a wireless LAN router. The AP 6 is configured to establish a basic Wi-Fi connection with a plurality of devices. Thus, a basic Wi-Fi network including the AP 6 and the plurality of devices is configured. The AP 6 receives data from one of the plurality of devices belonging to the basic Wi-Fi network, and transmits the data to another of the plurality of devices. Accordingly, the AP 6 is configured to relay communication between a pair of devices belonging to the basic Wi-Fi network.

Figure 2:
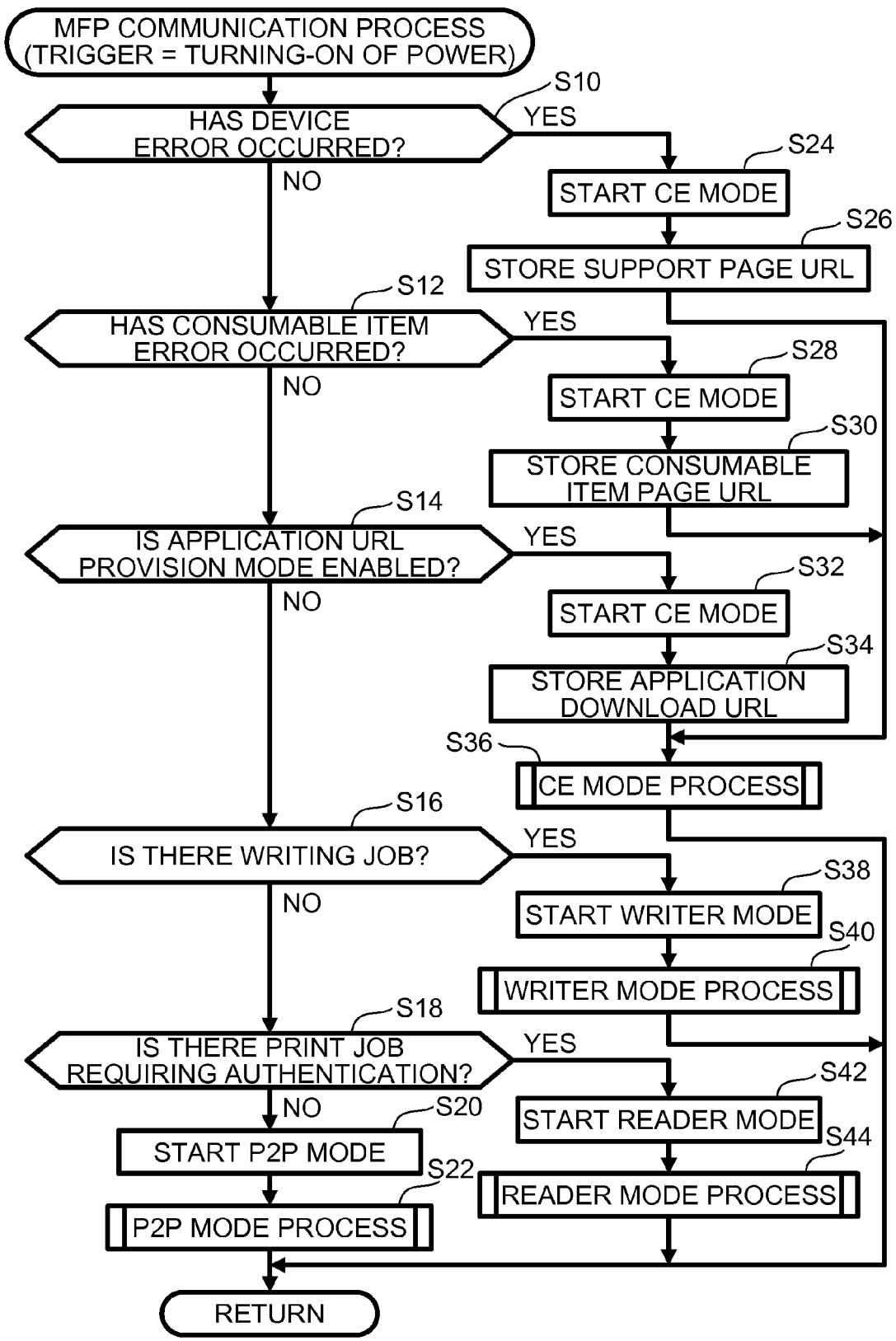
FIG. 2 is a flowchart depicting an example communication process performed by a multifunction peripheral ("MFP") in the illustrative embodiment according to one or more aspects of the disclosure.

Referring to FIG. 2, a detail of a communication process performed by the CPU 30 of the MFP 10 in accordance with the program will be further described. As the power of the MFP 10 is turned ON, the CPU 30 starts the communication process depicted in FIG. 2. After the communication process starts, the CPU 30 performs a determination in one or more of steps S10, S12, S14, S16, and S18 sequentially.

In step S10, the CPU 30 determines whether a device error has occurred in the MFP 10. The device error includes errors caused by any reasons except a consumable item being empty. For example, the device error may include a paper jam occurring in the printing execution unit 16 or a breakdown in the printing mechanism. The device error may further include a breakdown in the scanning execution unit 18 or a breakdown in the sensor. In step S10, the CPU 30 checks conditions of the units or portions of the MFP 10 (e.g., the printing execution unit 16 and the scanning execution unit 18). As a result of the condition check, when the CPU 30 determines that the device error has occurred, the CPU 30 makes a positive determination (e.g., YES) in step S10, and the routine proceeds to step S24. In step S24, the CPU 30 starts the CE mode. Thus, the MFP 10 starts operating in the CE mode. In step S24, the CPU 30 does not start the other modes (e.g., the P2P mode and the R/W mode). In step S26, the CPU 30 stores, in the NFC I/F 22, a URL of a webpage describing how to resolve the device error occurring in the MFP 10 (e.g., the support page URL). More specifically, the CPU 30 stores the support page URL stored in the memory 32 into the chip constituting the NFC I/F 22. Subsequent to step S26, the routine proceeds to step S36 and the CPU 30 performs a CE mode process (see FIG. 3). When the CPU 30 determines that a device error has not occurred in the MFP 10, the CPU 30 makes a negative determination (e.g., NO) in step S10, and the routine proceeds to step S12.

In step S12, the CPU 30 determines whether a consumable item error has occurred in the MFP 10. The consumable item error includes the absence or close to absence of a consumable item such as toner (or ink) or a sheet in the printing execution unit 16. The CPU 30 checks a condition of each consumable item in the printing execution unit 16. When the CPU 30 determines that the condition of at least one of the consumable items is insufficient to perform printing, the CPU 30 makes a positive determination (e.g., YES) in step S12, and the routine proceeds to step S28. In step S28, the CPU 30 starts the CE mode. Thus, the MFP 10 starts operating in the CE mode. In step S28, the CPU 30 does not start the other modes (e.g., the P2P mode and the R/W mode). In step S30, the CPU 30 stores, in the NFC I/F 22, a URL of a webpage for introducing consumable items (e.g., ink (or toner) and/or sheets) to be used in the MFP 10 (e.g., the consumable item URL). In one example, the CPU 30 stores the consumable item URL stored in the memory 32 into the chip constituting the NFC I/F 22. Subsequent to step S30, the routine proceeds to step S36 and the CPU 30 performs the CE mode process (see FIG. 3). When the CPU 30 determines that the conditions of all of the consumable items are sufficient to perform printing, the CPU 30 makes a negative determination (e.g., NO) in step S12, and the routine proceeds to step S14.

In step S14, the CPU 30 determines whether the application URL provision mode is enabled in the MFP 10. For example, in step S14, the CPU 30 determines whether the value indicating the detail of the application URL provision mode setting stored in the memory 32 indicates "ON". When the value representing the application URL provision mode setting indicates "ON", the CPU 30 makes a positive determination (e.g., YES) in step S14, and the routine proceeds to step S32. In step S32, the CPU 30 starts the CE mode. Thus, the MFP 10 starts operating in the CE mode. In step S32, the CPU 30 does not start the other modes (e.g., the P2P mode and the R/W mode). In step S34, the CPU 30 stores an application download URL in the NFC I/F 22. More specifically, the CPU 30 stores the application download URL stored in the memory 32 into the chip constituting the NFC I/F 22. Subsequent to step S34, the routine proceeds to step S36 and the CPU 30 performs the CE mode process (see FIG. 3). When the value indicating the application URL provision mode setting stored in the memory 32 indicates "OFF", the CPU 30 makes a negative determination (e.g., NO) in step S14, and the routine proceeds to step S16.

In step S16, the CPU 30 determines whether there is a writing job. For example, in step S16, the CPU 30 determines whether the memory 32 stores a writing job therein. As described above, when the CPU 30 receives a writing job from the PC 8 via the AP 6, the CPU 30 stores the received writing job in the memory 32. When the memory 32 stores a writing job therein, the CPU 30 makes a positive determination (e.g., YES) in step S16, and the routine proceeds to step S38. In step S38, the CPU 30 starts the Writer mode. Thus, the MFP 10 starts operating in the Writer mode. In step S38, the CPU 30 does not start the other modes. Then, in step S40, the CPU 30 performs a Writer mode process (see FIG. 4). When the memory 32 does not store a writing job therein, the CPU 30 makes a negative determination (e.g., NO) in step S16, and the routine proceeds to step S18. According to this configuration, the MFP 10 may operate in the Writer mode appropriately when the CPU 30 determines that the MFP 10 is in a state where the MFP 10 does not need to transmit the URL (e.g., the support page URL, the consumable item URL, or the application download URL) to the outside (e.g., an external destination) and has a writing job stored therein (e.g., YES in step S16).

In step S18, the CPU 30 monitors the presence of a print job that requires authentication. For example, in step S18, the CPU 30 determines whether the memory 32 stores a print job therein. As described above, when the CPU 30 receives a print job from the PC 8 via the AP 6, the CPU 30 stores the received print job in the memory 32. As described above, the MFP 10 does not perform printing unless authentication is performed using the identification card 100. When the memory 32 stores a print job therein, the CPU 30 makes a positive determination (e.g., YES) in step S18, and the routine proceeds to step S42. In step S42, the CPU 30 starts the Reader mode. Thus, the MFP 10 starts operating in the Reader mode. In step S42, the CPU 30 does not start the other modes. In step S44, the CPU 30 performs a Reader mode process (see FIG. 5). When the memory 32 does not store a print job, the CPU 30 makes a negative determination (e.g., NO) in step S18, and the routine proceeds to step S20. According to this configuration, the MFP 10 may operate in the Reader mode appropriately when the CPU 30 determines that the MFP 10 is in a state where the MFP 10 does not need to transmit the URL (e.g., the support page URL, the consumable item URL, or the application download URL) to the outside and does not have a writing job but a print job stored therein (e.g., YES in step S18).

In step S20, the CPU 30 starts the P2P mode. Thus, the MFP 10 starts operating in the P2P mode. In step S20, the CPU 30 does not start the other modes. Then, in step S22, the CPU 30 performs a P2P mode process (see FIG. 6).

As described above, in the illustrative embodiment, when a negative determination (e.g., NO) is made in each of steps S10, S12, S14, S16, and S18 in FIG. 2, the CPU 30 places the operation mode of the MFP 10 in the P2P mode (e.g., step S20). When the MFP 10 operates in the P2P mode, the MFP 10 is not in any state in which the MFP 10 needs to transmit the URL (e.g., the support page URL, the consumable item URL, and the application download URL), the state where the MFP 10 has a writing job therein, and the state where the MFP 10 has a print job therein. Therefore, according to the configuration of the illustrative embodiment, the MFP 10 may operate in an appropriate operation mode in accordance with the state of the MFP 10.

Figure 3:
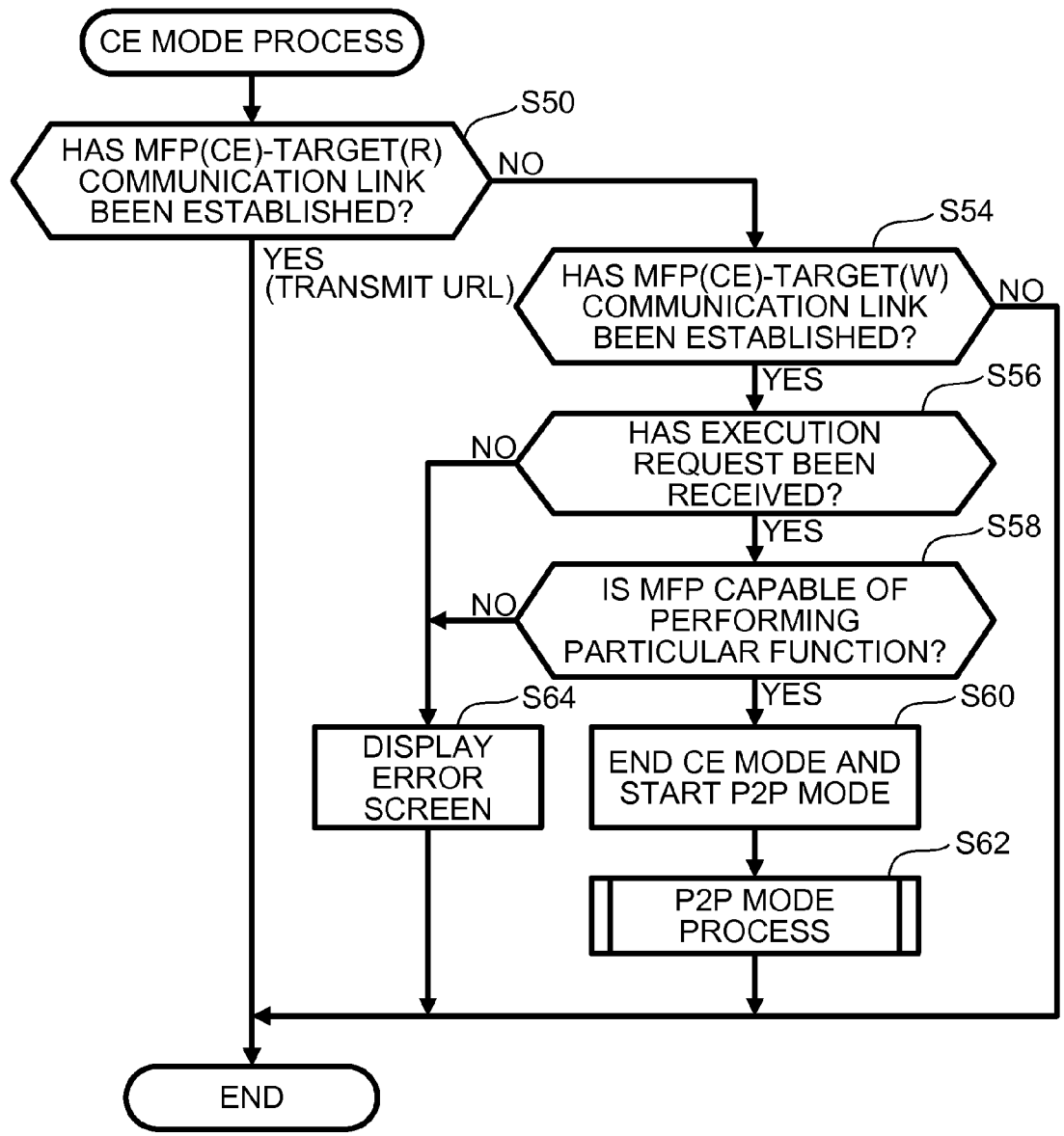
FIG. 3 is a flowchart depicting an example CE mode process performed by the MFP in the illustrative embodiment according to one or more aspects of the disclosure.

Referring to FIG. 3, a detail of the CE mode process (e.g., step S36 in FIG. 2) performed by the CPU 30 of the MFP 10 will be described. The CE mode process is performed by the CPU 30 of the MFP 10 operating in the CE mode. As the CE mode process starts, the CPU 30 performs monitoring in one or more of steps S50 and S54.

In step S50, the CPU 30 monitors establishment of an MFP(CE)-target(R) communication link. As described above, when the CPU 30 receives an Activation command corresponding to the Reader mode from the communication target (e.g., the mobile terminal 50), the CPU 30 determines that the MFP(CE)-target(R) communication link has been established. In this case, the CPU 30 makes a positive determination (e.g., YES) in step S50, and ends the CE mode process (e.g. FIG. 3 and step S36 in FIG. 2).

When the CPU 30 determines that the MFP(CE)-target(R) communication link has been established (e.g., YES in step S50), the NFC I/F 22 transmits the stored URL (e.g., the support page URL, the consumable item URL, or the application download URL) to the communication target automatically using the established MFP(CE)-target(R) communication link. According to this configuration, the MFP 10 may transmit an appropriate URL (e.g., the support page URL, the consumable item URL, or the application download URL) to the communication target using the MFP(CE)-target (R) communication link.

In step S54, the CPU 30 monitors establishment of an MFP(CE)-target(W) communication link. As described above, when the CPU 30 receives an Activation command corresponding to the Writer mode from the communication target (e.g., the mobile terminal 50) operating in the Writer mode, the CPU 30 determines that the MFP(CE)-target(W) communication link has been established. In this case, the CPU 30 makes a positive determination (e.g., YES) in step S54, and the routine proceeds to step S56.

In step S56, the CPU 30 monitors receipt of an execution request from the communication target via the NFC I/F 22 using the MFP(CE)-target(W) communication link. The execution request is a request signal for requesting an execution of a particular function (e.g., the scanning function or the printing function) of the MFP 10. When the CPU 30 receives an execution request from a communication target operating in the Writer mode, the CPU 30 makes a positive determination (e.g., YES) in step S56, and the routine proceeds to step S58. When the CPU 30 does not receive an execution request from the communication target within a predetermined timeout period or when the CPU 30 receives information other than the execution request from the communication target, the CPU 30 makes a negative determination (e.g., NO) in step S56, and the routine proceeds to step S64.

In step S58, the CPU 30 determines whether the MFP 10 is capable of performing the particular function indicated by the execution request. For example, when the particular function is printing, in step S58, the CPU 30 checks the condition of the printing execution unit 16 to determine whether one or both of a device error (e.g., a paper jam or a breakdown of the printing mechanism) and a consumable item error (e.g., toner (ink) empty or sheet empty) have occurred. As the result of the condition check, when the CPU 30 determines that none of the device error and the consumable item error has occurred in the printing execution unit 16, the CPU 30 determines that the particular function is executable. Even if a device error has occurred in the scanning execution unit 18, the CPU 30 determines that the particular function is executable (e.g., printing is executable) when the particular function is printing. In this case, the CPU 30 makes a positive determination (e.g., YES) in step S58, and the routine proceeds to step S60. In a case where at least one of a device error and a consumable item error has occurred in the printing execution unit 16 when the particular function is printing, the CPU 30 determines that the particular function is non-executable. In this case, the CPU 30 makes a negative determination (e.g., NO) in step S58, and the routine proceeds to step S64.

Likewise, for example, when the particular function is scanning, in step S58, the CPU 30 checks the condition of the scanning execution unit 18 to determine whether a device error (e.g., a breakdown of the document conveyor mechanism or a breakdown of the sensor) has occurred. As a result of the condition check, when the CPU 30 determines that a device error has not occurred in the scanning execution unit 18, the CPU 30 determines the particular function is executable. Although one or both of a device error and a consumable item error have occurred in the printing execution unit 16, the CPU 30 determines that the particular function is executable (e.g., scanning is executable) when the particular function is scanning. In this case, the CPU 30 makes a positive determination (e.g., YES) in step S58, and the routine proceeds in step S60. In a case where a device error has occurred in the scanning execution unit 18 when the particular function is scanning, the CPU 30 determines that the particular function is non-executable. In this case, the CPU 30 makes a negative determination (e.g., NO) in step S58, and the routine proceeds to step S64.

In step S64, the CPU 30 displays, on the display unit 14, an error screen including a message indicating that the particular function is non-executable. Subsequent to step S64, the CPU 30 ends the CE mode process (e.g., FIG. 3 and step S36 in FIG. 2).

In step S60, the CPU 30 ends the CE mode and starts the P2P mode. For example, first, the CPU 30 disconnects the MFP(CE)-target(W) communication link. That is, the CPU 30 performs communication (reception and transmission) of a Deactivation command and an OK command. The NFC standard defines that a Polling device needs to transmit a Deactivation command (e.g., a Listen device needs to receive a Deactivation command). At the time of performing the disconnection of the MFP(CE)-target(W) communication link, the communication target serves as the Polling device and the MFP 10 serves as the Listen device. Therefore, the CPU 30 receives a Deactivation command from the communication target via the NFC I/F 22 and transmits an OK command to the communication target via the NFC I/F 22. Then, the MFP(CE)-target(W) communication link is disconnected. After the MFP(CE)-target(W) communication link is disconnected, the CPU 30 ends the CE mode and starts the P2P mode. Thus, the MFP 10 starts operating in the P2P mode. The routine proceeds to step S62 and the CPU 30 performs the P2P mode process (see FIG. 6). As the CPU 30 ends the P2P mode process of step S62, the CPU 30 ends the CE mode process.

When neither of the MFP(CE)-target(R) communication link and the MFP(CE)-target(W) communication link is established, the CPU 30 makes a negative determination (e.g., NO) in each of steps S50 and S54, and ends the CE mode process.

After the CE mode process (e.g., FIG. 3 and step S36 in FIG. 2) ends, the routine returns to step S10 in FIG. 2 and the CPU 30 makes a determination in step S10 again. Thereafter, when the CPU 30 makes a positive determination (e.g., YES) in one of steps S12, S14, and S16 in FIG. 2, the CPU 30 performs the CE mode process of FIG. 3 again.

Next, referring to FIG. 4, further details of the Writer mode process (e.g., step S40 in FIG. 2) performed by the CPU 30 of the MFP 10 will be described. The Writer mode process is performed by the CPU 30 of the MFP 10 operating in the Writer mode. As the Writer mode process starts, the CPU 30 performs monitoring in one or more of steps S70 and S76.

In step S70, the CPU 30 monitors establishment of an MFP(W)-target(CE) communication link. When the CPU 30 transmits an Activation command corresponding to the Writer mode to the communication target operating in the CE mode (e.g., the identification card 100) and receives an OK command from the communication target, the CPU 30 determines that the MFP(W)-target(CE) communication link has been established. In this case, the CPU 30 makes a positive determination (e.g., YES) in step S70, and the routine proceeds to step S72.

In step S72, the CPU 30 transmits writing data (e.g., a URL designated by the user or text inputted by the user), included in a writing job stored in the memory 32, to the communication target (e.g., the identification card 100), using the mobile terminal(W)-target(CE) communication link. In step S74, the CPU 30 deletes the writing job stored in the memory 32. Subsequent to step S74, the CPU 30 ends the Writer mode process (e.g., FIG. 4 and step S40 in FIG. 2).

In step S76, the CPU 30 monitors detection of a device operating in the P2P mode. As described above, the MFP 10 operates in the Writer mode. For example, the MFP 10 serves as a Polling device. As further described above, the device operating in the P2P mode performs the Polling operation and the Listen operation repeatedly. Therefore, while the device operating in the P2P mode (hereinafter, referred to as a "particular device") performs the Listen operation, the particular device receives a polling signal transmitted by the NFC I/F 22 of the MFP 10. In response to the polling signal, the particular device transmits a response signal to the NFC I/F 22 of the MFP 10. Upon receipt of the response signal from the particular device, the NFC I/F 22 of the MFP 10 transmits an inquiry signal to inquire in which of the modes does the particular device operate. Upon receipt of the inquiry signal, the particular device transmits an active mode signal indicating that the particular device operates in the P2P mode, to the NFC I/F 22 of the MFP 10. The NFC I/F 22 of the MFP 10 receives the active mode signal indicating the particular device operates in the P2P mode, from the particular device. The NFC I/F 22 of the MFP 10 passes the active mode signal indicating that the particular device operates in the P2P mode, to the CPU 30. In this case, the CPU 30 makes a positive determination (e.g., YES) in step S76, and the routine proceeds to step S78.

In step S78, the CPU 30 ends the Writer mode and starts the P2P mode. Thus, the MFP 10 starts operating in the P2P mode. The routine proceeds to step S80 and the CPU 30 performs the P2P mode process (see FIG. 6). After the P2P mode process in step S80 ends, the CPU 30 ends the Writer mode process.

When an MFP(W)-target(CE) communication link is not established and a device operating in the P2P mode is not detected, the CPU 30 makes a negative determination (e.g., NO) in each of steps S70 and S76 and ends the Writer mode process.

After the Writer mode process (e.g., FIG. 4 and step S40 in FIG. 2) ends, the routine returns to step S10 in FIG. 2 and the CPU 30 performs the determination in step S10 again. Thereafter, when the CPU 30 makes a positive determination (e.g., YES) in step S16 in FIG. 2, the CPU 30 performs the Writer mode process of FIG. 4 again.

Next, referring to FIG. 5, a detail of the Reader mode process (e.g., step S44 of FIG. 2) performed by the CPU 30 of the MFP 10 will be described. The Reader mode process is performed by the CPU 30 of the MFP 10 operating in the Reader mode. As the Reader mode process starts, the CPU 30 performs monitoring in one or more of steps S90 and S98.

In step S90, the CPU 30 monitors establishment of an MFP(R)-target(CE) communication link. When the CPU 30 transmits an Activation command corresponding to the Reader mode to the communication target operating in the CE mode (e.g., the identification card 100) and receives an OK command from the communication target, the CPU 30 determines that an MFP(R)-target(CE) communication link has been established. In this case, the CPU 30 makes a positive determination (e.g., YES) in step S90, and the routine proceeds to step S92.

In step S92, the CPU 30 receives authentication data from the communication target (e.g., the identification card 100) via the NFC I/F 22 using the MFP(R)-target(CE) communication link. In step S94, the CPU 30 performs the authentication process using the received authentication data. When the authentication is successful, the CPU 30 allows the printing execution unit 16 to print an image represented by print data included in a print job. As the printing is completed, the routine proceeds to step S96. In step S96, the CPU 30 deletes the print job from the memory 32. Subsequent to step S96, the CPU 30 ends the Reader mode process (e.g., FIG. 5 and step S44 in FIG. 2).

In step S98, the CPU 30 monitors detection of a device operating in the P2P mode (e.g., the particular device). As described above, the MFP 10 operates in the Reader mode. That is, the MFP 10 serves as the Polling device. As described above, the particular device operating in the P2P mode performs the Polling operation and the Listen operation repeatedly. Therefore, while the particular device performs the Listen operation, the particular device receives a polling signal transmitted by the NFC I/F 22 of the MFP 10. Upon receipt of the polling signal, the particular device transmits a response signal to the NFC I/F 22 of the MFP 10. Upon receipt of the response signal from the particular device, the NFC I/F 22 of the MFP 10 transmits an inquiry signal to inquire in which of the modes does the particular device operate. Upon receipt of the inquiry signal, the particular device transmits an active mode signal indicating that the particular device operates in the P2P mode to the NFC I/F 22 of the MFP 10. The NFC I/F 22 of the MFP 10 receives, from the particular device, the active mode signal indicating that the particular device operates in the P2P mode. The NFC I/F 22 of the MFP 10 passes the information indicating that the particular device operates in the P2P mode, to the CPU 30. In this case, the CPU 30 makes a positive determination (e.g., YES) in step S98 and the routine proceeds to step S100.

In step S100, the CPU 30 ends the Reader mode and starts the P2P mode. Thus, the MFP 10 starts operating in the P2P mode. The routine proceeds to step S102 and the CPU 30 performs the P2P mode process (see FIG. 6). After the P2P mode process in step S102 ends, the CPU 30 ends the Reader mode process.

When an MFP(R)-target(CE) communication link is not established and a device operating in the P2P mode is not detected, the CPU 30 makes a negative determination (e.g., NO) in each of steps S90 and S98 and ends the Reader mode process.

As the Reader mode process (e.g., FIG. 5 and step S44 in FIG. 2) ends, the routine returns to step S10 in FIG. 2 and the CPU 30 makes the determination in step S10 again. Thereafter, when the CPU 30 make a positive determination (e.g., YES) in step S18 in FIG. 2, the CPU 30 performs the Reader mode process of FIG. 5 again.

Next, referring to FIG. 6, further details of the P2P mode process (e.g., step S22 in FIG. 2, step S62 in FIG. 3, step S80 in FIG. 4, and step S102 in FIG. 5) performed by the CPU 30 of the MFP 10 will be described. The P2P mode process is performed by the CPU 30 of the MFP 10 operating in the P2P mode. As the P2P mode process starts, the CPU 30 performs monitoring in step S110.

In step S110, the CPU 30 monitors establishment of a P2P communication link. As described above, for example, in a case where the MFP 10 serves as the Polling device, the CPU 30 determines that a P2P communication link has been established when the CPU 30 transmits an Activation command corresponding to the P2P mode to the communication target (e.g., the mobile terminal 50) operating in the P2P mode and receives an OK command from the communication target. In this case, the CPU 30 makes a positive determination (e.g., YES) in step S110 and the routine proceeds to step S112. For example, in a case where the MFP 10 serves as the Listen device, the CPU 30 determines that a P2P communication link has been established when the CPU 30 receives an Activation command corresponding to the P2P mode from the communication target (e.g., the mobile terminal 50) operating in the P2P mode and transmits an OK command to the communication target. In this case, also, the CPU 30 makes a positive determination (e.g., YES) in step S110 and the routine proceeds to step S112.

In step S112, the CPU 30 performs two-way communication (hereinafter, referred to as "P2P communication") with the communication target (e.g., the mobile terminal 50) via the NFC I/F 22 using the P2P communication link. More specifically, first, the CPU 30 receives an execution request for an execution of the particular function and network information related to the network to which the communication target belongs, from the communication target. Nevertheless, when the CPU 30 has already been received the execution request from the communication target as of step S112 (e.g., YES in each of steps S56 and S58 in FIG. 3), the CPU 30 does not receive another execution request from the communication target again. The CPU 30 transmits, to the communication target, one of setting information and change-unnecessary information. The setting information includes a wireless setting (e.g., an authentication method, an encryption method, a password, an SSID, and a BSSID) of the network to which the MFP 10 belongs, and the change-unnecessary information indicates that the setting change is unnecessary. The detail of two-way communication performed in step S112 depends on whether the communication target belongs to a network. Hereinafter, the detail of two-way communication performed in step S112 will be described for each case.

When the communication target belongs to a network, the communication target transmits, to the MFP 10, an execution request for an execution of a particular function and the wireless setting (e.g., SSID and BSSID) of the network (e.g., a wireless LAN or a WFD network) to which the communication target belongs. Nevertheless, as described above, when the communication target has already transmitted the execution request to the MFP 10 (e.g., YES in step S56 and YES in step S58 in FIG. 3), the communication target does not transmit another execution request to the MFP 10 again. The CPU 30 receives the execution request and the wireless setting of the network to which the communication target belongs. In this case, the wireless setting of the network to which the communication target belongs is the "network information" of the communication target.

The CPU 30 determines, based on the received wireless setting, whether the MFP 10 belongs to the same network to which the communication target belongs. That is, the CPU 30 determines whether the received SSID and BSSID coincide with an SSID and a BSSID, respectively, included in the wireless setting of the network to which the MFP 10 belongs. When the CPU 30 determines that the MFP 10 belongs to the same network to which the communication target belongs, the CPU 30 transmits, to the communication target, the change-unnecessary information indicating that the setting change is unnecessary.

When the CPU 30 determines that the network to which the MFP 10 belongs differs from the network to which the communication target belongs, the CPU 30 transmits a wireless setting (e.g., an authentication method, an encryption method, a password, an SSID, and a BSSID) of a WFD network in which the MFP 10 serves as a group owner, to the communication target. For example, when the MFP 10 belongs to a WFD network, as a group owner, the CPU 30 transmits the wireless setting used in the WFD network to the communication target. For example, when the MFP 10 does not belong to the WFD network in which the MFP 10 serves as a group owner, the CPU 30 changes the status of the MFP 10 to the G/O status and establishes a new WFD network. Then, the CPU 30 transmits a wireless setting of the WFD network to the communication target.

When the communication target does not belong to any network, the communication target transmits, to the MFP 10, an execution request for executing a particular function and information indicating that the communication target does not belong to any network. Nevertheless, also, in this case, when the communication target has already transmitted the execution request to the MFP 10 (e.g., YES in each steps S56 and S58 in FIG. 3), the communication target does not transmit another execution request to the MFP 10 again. The CPU 30 receives the execution request and the information indicating that the communication target does not belong to any network. In this case, the information indicating that the communication target does not belong to any network is the "network information" of the communication target.

Then, the CPU 30 determines whether the MFP 10 belongs to the WFD network in which the MFP 10 itself serves as a group owner. When the CPU 30 determines that the MFP 10 belongs to the WFD network in which the MFP 10 itself serves as a group owner, the CPU 30 transmits a wireless setting used in the WFD network to the communication target.

When the CPU 30 determines that the MFP 10 does not belong to the WFD network in which the MFP 10 itself serves as a group owner, the CPU 30 changes the status of the MFP 10 to the G/O status and establishes a new WFD network. Then, the CPU 30 transmits a wireless setting of the WFD network to the communication target.

Through the two-way communication in step S112, the wireless setting becomes available for common use in both the MFP 10 and the communication target. The CPU 30 establishes a wireless communication link (e.g., a WFD connection or a basic Wi-Fi connection) between the MFP 10 and the communication target via the wireless LAN I/F 20, using the common use wireless setting.

Then, in step S114, the CPU 30 executes the particular function indicated by the execution request. More specifically, in step S114, the CPU 30 performs communication of target data to be used to execute the particular function indicated by the execution request, between the MFP 10 and the communication target, via the wireless LAN I/F 20, using the established wireless communication link. For example, when the particular function is printing, the communication target transmits print data (e.g., target data) to the MFP 10. Upon receipt of the target data, the CPU 30 allows the printing execution unit 16 to print an image represented by the target data. In another case, for example, when the particular function is scanning, the CPU 30 allows the scanning execution unit 18 to scan one or more documents placed on a document feed mechanism to generate scan data (e.g., target data). The CPU 30 transmits the generated target data to the communication target.

Subsequent to step S114, the CPU 30 ends the P2P mode process. When a P2P communication link is not established, the CPU 30 makes a negative determination (e.g., NO) in step S110 and ends the P2P mode process. After the P2P mode process (e.g., step S22 in FIG. 2, step S62 in FIG. 3, step S80 in FIG. 4, and step S102 in FIG. 5) ends, the routine returns to step S10 of FIG. 2 and the CPU 30 performs the determination in step S10 again. Thereafter, when a negative determination (e.g., NO) is made in step S18 in FIG. 2, when a positive determination (e.g., YES) is made in step S58 in FIG. 3, when a positive determination (e.g., YES) is made in step S76 in FIG. 4, or when a positive determination (e.g., YES) is made in step S98 in FIG. 5, the CPU 30 performs the P2P mode process of FIG. 6 again.

Referring to FIG. 7, example communication performed between the MFP 10 and one of the mobile terminals 50 and 80 when the MFP 10 operates in the CE mode will be described below. In FIG. 7, two communication examples will be described wherein one example is communication performed between the MFP 10 operating in the CE mode and the mobile terminal 50 operating in the Reader mode, and the other example is communication performed between the MFP 10 operating in the CE mode and the mobile terminal 80 operating in the P2P mode.

In the example depicted in FIG. 7, after the power of the MFP 10 is turned on, the application URL provision mode setting is changed to "ON" through an operation performed on the operation unit 12. Thus, the value indicating "ON" of the application URL provision mode setting is stored in the memory 32 of the MFP 10 (e.g., YES in step S14 in FIG. 2). Therefore, the MFP 10 starts operating in the CE mode (e.g., step S32 in FIG. 2). Then, the MFP 10 stores the application download URL in the NFC I/F 22 (e.g., step S34 in FIG. 2). Thereafter, the MFP 10 monitors establishment of one of an MFP(CE)-target(W) communication link and an MFP(CE)-target(R) communication link (e.g., step S50 or S54 in FIG. 3).

In the example depicted in FIG. 7, the application for MFP has not yet been installed on the mobile terminal 50. When the power of the mobile terminal 50 is turned on, the mobile terminal 50 enters into the initial status in which the Reader mode is active and the other modes are inactive. Then, the mobile terminal 50 monitors establishment of a mobile terminal(R)-target(CE) communication link.

As the mobile terminal 50 is brought closer to the MFP 10 under this situation, the NFC I/F 22 of the MFP 10 and the NFC I/F 58 of the mobile terminal 50 come closer to each other so that the NFC I/F 22 and the NFC I/F 58 become communicable to each other (e.g., a distance therebetween is shorter than 10 cm). Thus, an MFP 10(CE)-mobile terminal 50(R) communication link is established between the MFP 10 and the mobile terminal 50 via the NFC I/F 22 and the NFC I/F 58 (e.g., YES in step S50 in FIG. 3).

After the MFP 10(CE)-mobile terminal 50(R) communication link is established between the MFP 10 and the mobile terminal 50, the NFC I/F 22 of the MFP 10 transmits the application download URL stored in the NFC I/F 22 to the mobile terminal 50 using the MFP 10(CE)-mobile terminal 50(R) communication link. The mobile terminal 50 receives the application download URL.

The mobile terminal 50 accesses a server (e.g., a server offered by the vendor of the MFP 10) indicated by the application download URL, using the received application download URL, to download the application for MFP. Then, the mobile terminal 50 installs the downloaded application for MFP in the memory 64. With this installation, the mobile terminal 50 becomes capable of performing various processes in accordance with the application for MFP.

The mobile terminal 80 has the application for MFP already installed thereon. As a function execution instruction (e.g., the scanning instruction or the printing instruction) is inputted via the operation portion after the application for MFP starts, the mobile terminal 80 shifts to a state where the P2P mode is active and the other modes are inactive.

As the mobile terminal 80 is brought closer to the MFP 10 under this situation, the mobile terminal 80 operating in the P2P mode detects that the MFP 10 is operating in the CE mode. As described above, the mobile terminal operating in the P2P mode performs the Polling operation and the Listen operation repeatedly. The MFP 10 operating in the CE mode serves as a Listen device that performs the Listen operation. When the mobile terminal 80 performs the Polling operation, the mobile terminal 80 transmits a polling signal to the MFP 10 serving as a Listen device. Upon receipt of the polling signal from the mobile terminal 80, the MFP 10 transmits a response signal to the mobile terminal 80. Upon receipt of the response signal from the MFP 10, the mobile terminal 80 transmits an inquiry signal to inquire which of the modes the MFP 10 operates. Upon receipt of the inquiry signal, the MFP 10 transmits an active mode signal indicating that the MFP 10 is operating in the CE mode, to the mobile terminal 80. Thus, the mobile terminal 80 detects that the MFP 10 is operating in the CE mode.

When the mobile terminal 80 detects that the MFP 10 is operating in the CE mode, the mobile terminal 80 ends the P2P mode and starts the Writer mode. Then, the mobile terminal 80 monitors establishment of a mobile terminal(W)-target(CE) communication link.

When the MFP 10 and the mobile terminal 80 are present within a range in which the MFP 10 and the mobile terminal 80 can perform NFC communication with each other under the above situation, an MFP 10(CE)-mobile terminal 80(W) communication link is established between the MFP 10 and the mobile terminal 80 (e.g., YES in step S54 in FIG. 3).

After the MFP 10(CE)-mobile terminal 80(W) communication link is established between the MFP 10 and the mobile terminal 80, the mobile terminal 80 transmits an execution request for an execution of the particular function to the MFP 10 using the MFP 10(CE)-mobile terminal 80(W) communication link. Upon receipt of the execution request, the mobile terminal 80 ends the Writer mode and starts the P2P mode. Then, the mobile terminal 80 monitors establishment of a P2P communication link.

The MFP 10 receives the execution request via the NFC I/F 22 (e.g., YES in step S56 in FIG. 3). Then, the MFP 10 determines whether the particular function indicated by the execution request is executable (e.g., step S58 in FIG. 3). In the example depicted in FIG. 7, the MFP 10 determines that the particular function is executable (e.g., YES in step S58 in FIG. 3). Then, the MFP 10 ends the CE mode and starts the P2P mode (e.g., step S60 in FIG. 3). Thus, the MFP 10 and the mobile terminal 80 disconnect the MFP 10(CE)-mobile terminal 80(W) communication link. Then, the MFP 10 monitors establishment of a P2P communication link (e.g., step S110 in FIG. 6).

Figure 6:
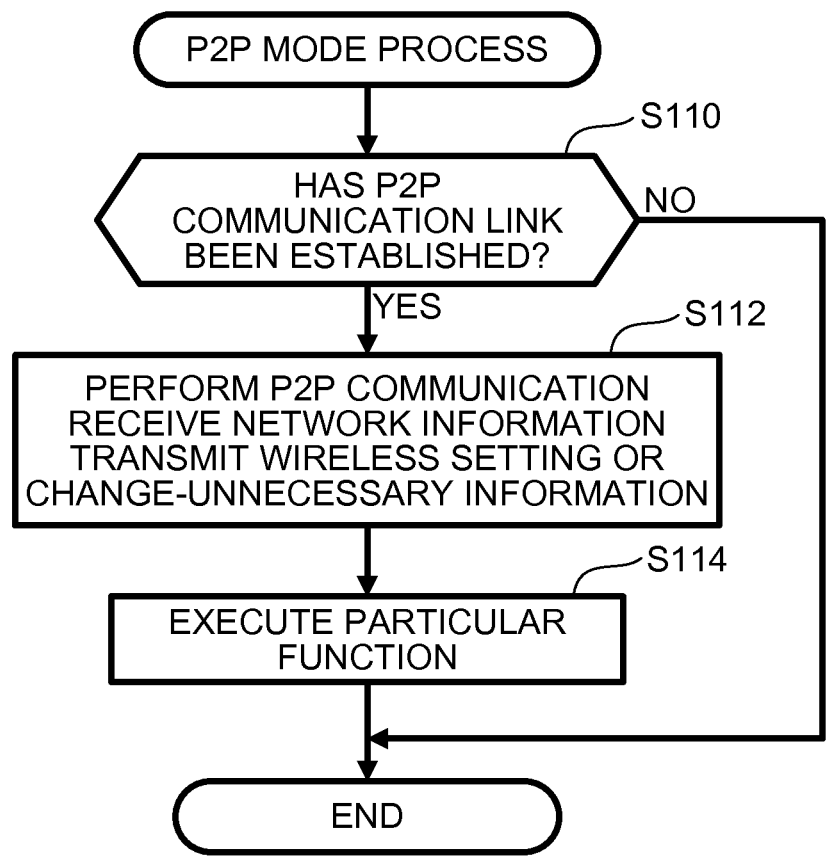
FIG. 6 is a flowchart depicting an example P2P mode process performed by the MFP in the illustrative embodiment according to one or more aspects of the disclosure.

When the MFP 10 and the mobile terminal 80 are present within a range in which the MFP 10 and the mobile terminal 80 can perform NFC communication with each other under the above situation, a P2P communication link is established between the MFP 10 and the mobile terminal 80 (e.g., YES in step S110 in FIG. 6). Then, P2P communication is performed between the MFP 10 and the mobile terminal 80 using the P2P communication link (e.g., step S112 in FIG. 6). For example, the mobile terminal 80 transmits network information (e.g., the wireless setting of the network to which the mobile terminal 80 belongs or the information indicating that the mobile terminal 80 does not belong to any network) to the MFP 10. In the example depicted in FIG. 7, the mobile terminal 80 has already transmitted the execution request to the MFP 10 and the mobile terminal 80 therefore does not transmit another execution request to the MFP 10 at this time. Next, the MFP 10 transmits one of the wireless setting of the WFD network in which the MFP 10 itself serves as the group owner and the change-unnecessary information to the mobile terminal 80. According to this configuration, the MFP 10 may change the operation mode of the MFP 10 from the CE mode to the P2P mode appropriately. Therefore, the MFP 10 may perform P2P communication appropriately with the mobile terminal 80 using the P2P communication link.

Through the P2P communication, the wireless setting becomes available for common use in both the MFP 10 and the mobile terminal 80. The MFP 10 and the mobile terminal 80 establish a wireless communication link (e.g., a WFD connection or a basic Wi-Fi connection) therebetween via the wireless LAN I/F 20 and the wireless LAN I/F of the mobile terminal 80, using the common use wireless setting.

Then, the MFP 10 and the mobile terminal 80 perform communication of target data, to be used to execute the particular function indicated by the execution request, therebetween via the wireless LAN I/F 20 and the wireless LAN I/F of the mobile terminal 80, using the established wireless communication link (e.g., step S114 in FIG. 6). For example, when the particular function is printing, the mobile terminal 80 transmits print data (e.g., target data) to the MFP 10. Upon receipt of the target data, the MFP 10 allows the printing execution unit 16 to print an image represented by the target data. When the particular function is scanning, the CPU 30 allows the scanning execution unit 18 to scan one or more documents placed on the document feed mechanism to generate scan data (e.g., target data). The MFP 10 transmits the generated target data to the mobile terminal 80.

After the execution of the particular function is completed, the mobile terminal 80 ends the running application for MFP.

Referring to FIG. 8, example communication performed between the MFP 10 and one of the identification card 100 and the mobile terminal 80 when the MFP 10 operates in the Writer mode will be described. In FIG. 8, two communication examples will be described wherein one example is communication performed between the MFP 10 operating in the Writer mode and the identification card 100 operating in the CE mode and the other example is communication performed between the MFP 10 operating in the Writer mode and the mobile terminal 80 operating in the P2P mode.

In the example depicted in FIG. 8, after the power of the MFP 10 is turned on, the MFP 10 receives a writing job from the PC 8 via the AP 6. The MFP 10 stores the received writing job in the memory 32 (e.g., YES in step S16 in FIG. 2). Thus, the MFP 10 starts operating in the Writer mode (e.g., step S38 in FIG. 2). Then, while monitoring establishment of an MFP (W)-target(CE) communication link (e.g., step S70 in FIG. 4), the MFP 10 monitors detection of a device operating in the P2P mode (e.g., step S76 in FIG. 4).

In some arrangements, the identification card 100 operates in the CE mode at all times. Accordingly, as the identification card 100 is brought closer to the MFP 10, an MFP 10(W)-identification card 100(CE) communication link is established between the MFP 10 and the identification card 100 (e.g., YES in step S70 in FIG. 4).

Figure 4:
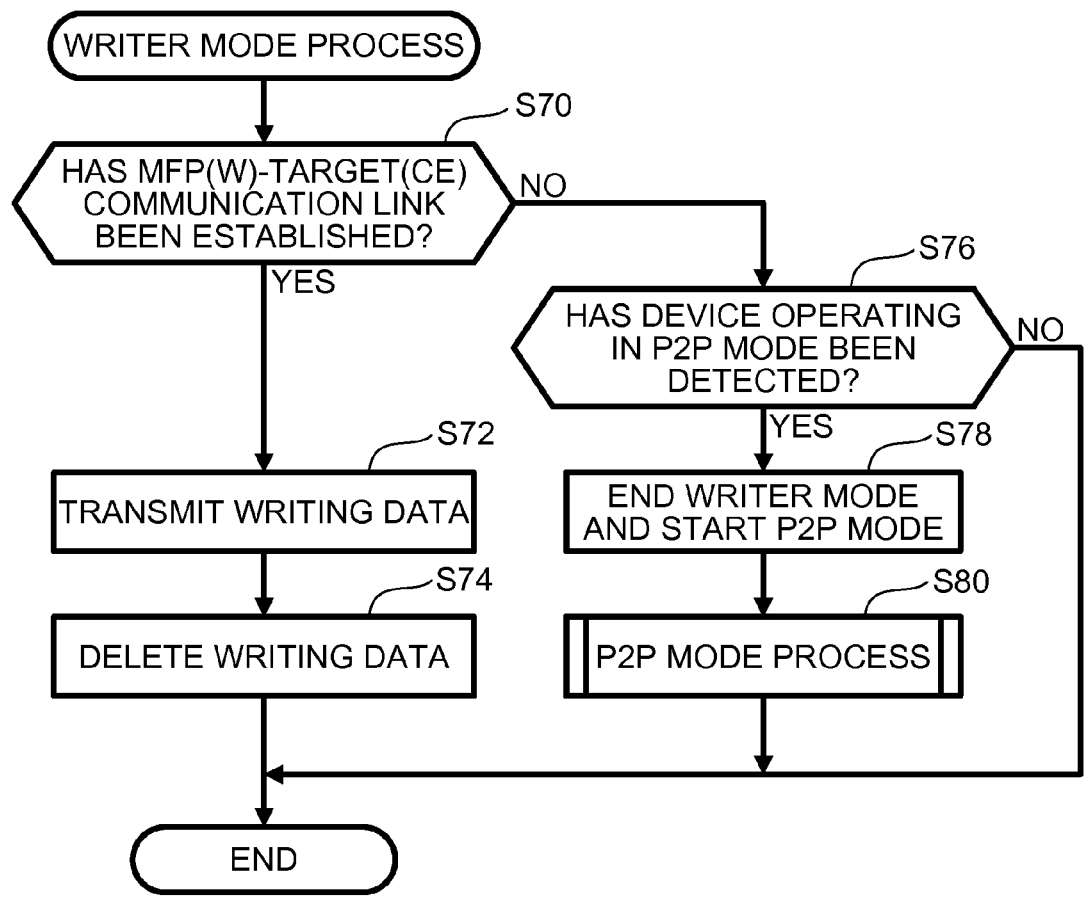
FIG. 4 is a flowchart depicting an example Writer mode process performed by the MFP in the illustrative embodiment according to one or more aspects of the disclosure.

After the MFP 10(W)-identification card 100(CE) communication link is established between the MFP 10 and the identification card 100, the MFP 10 transmits writing data (e.g., the URL designated by the user and/or text inputted by the user) included in the writing job stored in the memory 32 to the identification card 100 using the MFP 10(W)-identification card 100(CE) communication link (e.g., step S72 in FIG. 4). The identification card 100 receives the writing data and stores the received writing data therein.

After transmitting the writing data, the MFP 10 deletes the writing job from the memory 32 (e.g., step S74 in FIG. 4).

In the example depicted in FIG. 8, the mobile terminal 80 has the application for MFP already installed thereon. As a function execution instruction (e.g., the scanning instruction or the printing instruction) is inputted via the operation portion after the application for MFP starts, the mobile terminal 80 starts operating in the P2P mode.

As the mobile terminal 80 is brought closer to the MFP 10 under this situation, the MFP 10 operating in the Writer mode detects that the mobile terminal 80 is operating in the P2P mode. The MFP 10 operating in the Writer mode serves as a Polling device that performs the Polling operation. The mobile terminal 80 operating in the P2P mode performs the Polling operation and the Listen operation repeatedly. While the mobile terminal 80 performs the Listen operation, the mobile terminal 80 receives a polling signal transmitted by the MFP 10 serving as the Polling device. Upon receipt of the polling signal, the mobile terminal 80 transmits a response signal to the MFP 10. Upon receipt of the response signal from the mobile terminal 80, the MFP 10 transmits an inquiry signal to inquire in which of the modes the mobile terminal 80 operates. Upon receipt of the inquiry signal, the mobile terminal 80 transmits an active mode signal indicating that the mobile terminal 80 is operating in the P2P mode, to the MFP 10. Thus, the MFP 10 may detect that the mobile terminal 80 is operating in the P2P mode (e.g., YES in step S76 in FIG. 4).

When the MFP 10 detects the mobile terminal 80 operating in the P2P mode, the MFP 10 ends the Writer mode and starts the P2P mode (e.g., step S78 in FIG. 4). Then, the MFP 10 monitors establishment of a P2P communication link (e.g., step S110 in FIG. 6).

When the MFP 10 and the mobile terminal 80 are present within a range in which the MFP 10 and the mobile terminal 80 can perform NFC communication with each other under the above situation, a P2P communication link is established between the MFP 10 and the mobile terminal 80 (e.g., YES in step S110 in FIG. 6). Then, P2P communication is performed between the MFP 10 and the mobile terminal 80 using the P2P communication link (e.g., step S112 in FIG. 6). For example, the mobile terminal 80 transmits, to the MFP 10, an execution request for requesting execution of the particular function and network information (e.g., one of the wireless setting of the network to which the mobile terminal 80 belongs and the information indicating that the mobile terminal 80 does not belong to any network). Then, the MFP 10 transmits, to the mobile terminal 80, a wireless setting of the WFD network in which the MFP 10 itself serves as a group owner and the change-unnecessary information. According to this configuration, the MFP 10 may change the operation mode of the MFP 10 from the Writer mode to the P2P mode appropriately. Therefore, the MFP 10 may perform P2P communication with the mobile terminal 80 appropriately using the P2P communication link.

Through the P2P communication, the wireless setting becomes available for common use in both the MFP 10 and the mobile terminal 80. The MFP 10 and the mobile terminal 80 establish a wireless communication link (e.g., a WFD connection or a basic Wi-Fi connection) therebetween via the wireless LAN I/F 20 and the wireless LAN I/F of the mobile terminal 80 using the common use wireless setting.

Then, the MFP 10 and the mobile terminal 80 perform communication of target data to be used to execute the particular function indicated by the execution request, therebetween via the wireless LAN I/F 20 and the wireless LAN I/F of the mobile terminal 80, using the established wireless communication link (e.g., step S114 in FIG. 6). For example, when the particular function is printing, the mobile terminal 80 transmits print data (e.g., target data) to the MFP 10. Upon receipt of the target data, the MFP 10 allows the printing execution unit 16 to print an image represented by the target data. When the particular function is scanning, the MFP 10 allows the scanning execution unit 18 to scan one or more documents placed on the document feed mechanism to generate scan data (e.g., target data). The MFP 10 transmits the generated target data to the mobile terminal 80.

After the execution of the particular function is completed, the mobile terminal 80 ends the running application for MFP.

Referring to FIG. 9, example communication performed between the MFP 10 and one of the identification card 100 and the mobile terminal 80 when the MFP 10 operates in the Reader mode will be described. In FIG. 9, two communication examples will be described wherein one example is communication performed between the MFP 10 operating in the Reader mode and the identification card 100 operating in the CE mode and the other example is communication performed between the MFP 10 operating in the Reader mode and the mobile terminal 80 operating in the P2P mode.

In the example depicted in FIG. 9, after the power of the MFP 10 is turned on, the MFP 10 receives a print job from the PC 8 via the AP 6. The MFP 10 stores the received print job in the memory 32 (e.g., YES in step S18 in FIG. 2). Thus, the MFP 10 starts operating in the Reader mode (e.g., step S42 in FIG. 2). Then, while monitoring establishment of an MFP (R)-target(CE) communication link of the MFP 10 (e.g., step S90 in FIG. 5), the MFP 10 monitors detection of a device operating in the P2P mode (e.g., step S98 in FIG. 5).

As described above, the identification card 100 operates in the CE mode at all times. As the identification card 100 is brought closer to the MFP 10, an MFP 10(R)-identification card 100(CE) communication link is established between the MFP 10 and the identification card 100 (e.g., YES in step S90 in FIG. 5).

Figure 5:
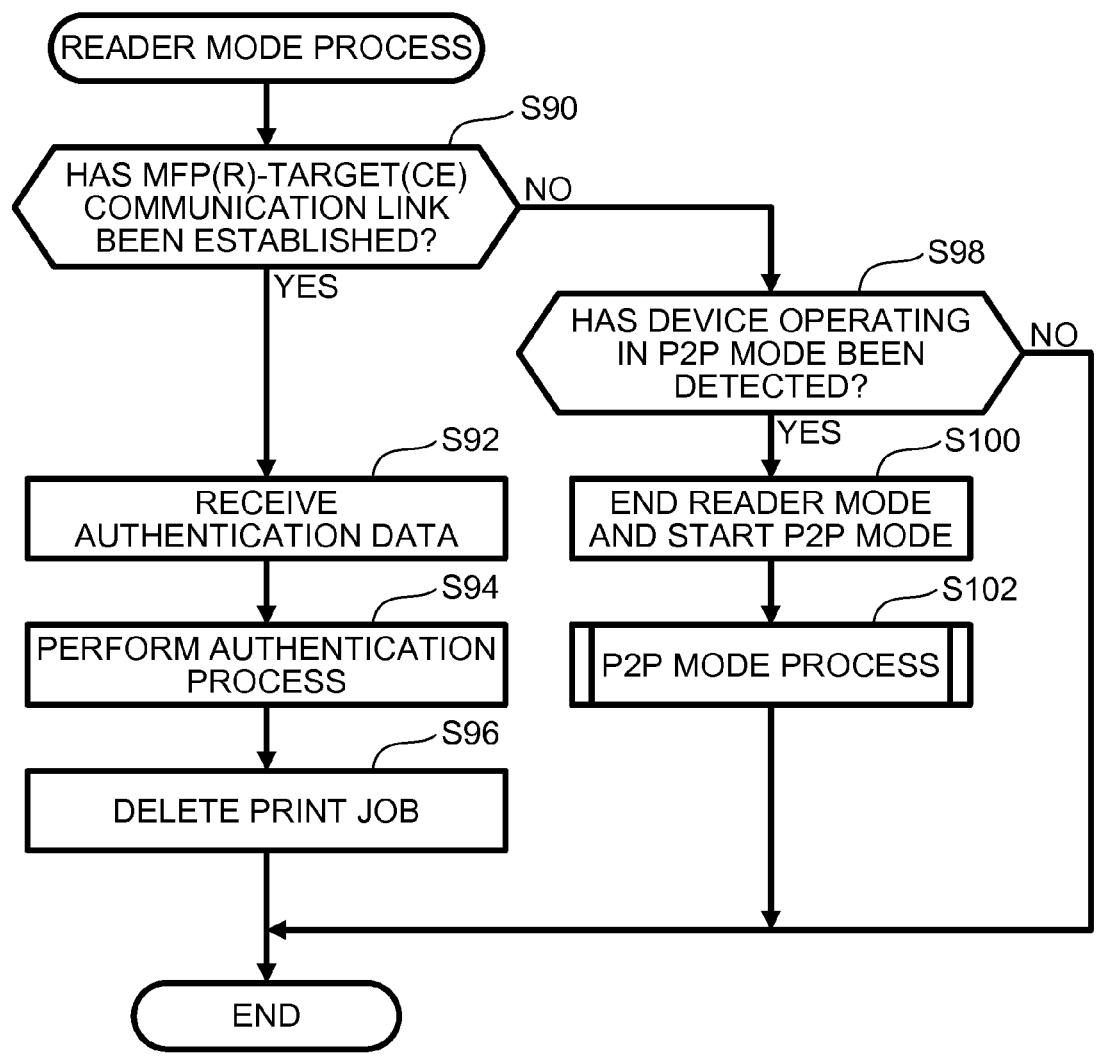
FIG. 5 is a flowchart depicting an example Reader mode process performed by the MFP in the illustrative embodiment according to one or more aspects of the disclosure.

After the MFP 10(R)-identification card 100(CE) communication link is established between the MFP 10 and the identification card 100, the MFP 10 receives, from the identification card 100, authentication data stored in the identification card 100, using the MFP 10(R)-identification card 100(CE) communication link (e.g., step S92 in FIG. 5).

Then, the MFP 10 performs the authentication process using the received authentication data (e.g., step S94 in FIG. 5). In the example depicted in FIG. 9, authentication succeeds. After successful authentication, the MFP 10 allows the printing execution unit 16 to print an image represented by print data included in the print job. After the printing is completed, the MFP 10 deletes the print job from the memory 32 (e.g., step S96 in FIG. 5).

In the example depicted in FIG. 9, the mobile terminal 80 has the application for MFP already installed thereon. As a function execution instruction (e.g., the scanning instruction or the printing instruction) is inputted via the operation portion after the application for MFP starts, the mobile terminal 80 starts operating in the P2P mode.

As the mobile terminal 80 is brought closer to the MFP 10 under this situation, the MFP 10 operating in the Reader mode detects that the mobile terminal 80 is operating in the P2P mode. The MFP 10 operating in the Reader mode serves as a Polling device that performs the Polling operation. The mobile terminal 80 operating in the P2P mode performs the Polling operation and the Listen operation repeatedly. While the mobile terminal 80 performs the Listen operation, the mobile terminal 80 receives a polling signal transmitted by the MFP 10 serving as the Polling device. Upon receipt of the polling signal, the mobile terminal 80 transmits a response signal to the MFP 10. Upon receipt of a response signal from the mobile terminal 80, the MFP 10 transmits an inquiry signal to inquire in which of the modes does the mobile terminal 80 operate. Upon receipt of the inquiry signal, the mobile terminal 80 transmits an active mode signal indicating that the mobile terminal 80 is operating in the P2P mode, to the MFP 10. Thus, the MFP 10 may detect that the mobile terminal 80 is operating in the P2P mode (e.g., YES in step S98 in FIG. 5).

When the MFP 10 detects the mobile terminal 80 operating in the P2P mode, the MFP 10 ends the Reader mode and starts the P2P mode (e.g., step S100 in FIG. 5). Then, the MFP 10 monitors establishment of a P2P communication link (e.g., step S110 in FIG. 6).

When the MFP 10 and the mobile terminal 80 are present within a range in which the MFP 10 and the mobile terminal 80 can perform NFC communication with each other under the above situation, a P2P communication link is established between the MFP 10 and the mobile terminal 80 (e.g., YES in step S110 in FIG. 6). Then, P2P communication is performed between the MFP 10 and the mobile terminal 80 using the P2P communication link (e.g., step S112 in FIG. 6). The P2P communication performed here is the same as the P2P communication performed in the example depicted in FIG. 8, and therefore, a detailed description will be omitted. According to this configuration, the MFP 10 may change the operation mode of the MFP 10 from the Reader mode to the P2P mode appropriately. Therefore, the MFP 10 may perform P2P communication with the mobile terminal 80 appropriately using the P2P communication link.

Through the P2P communication, the wireless setting becomes available for common use in both the MFP 10 and the mobile terminal 80. Similar to the example depicted in FIG. 8, the MFP 10 and the mobile terminal 80 establish a wireless communication link (e.g., a WFD connection or a basic Wi-Fi connection) therebetween via the wireless LAN I/F 20 and the wireless LAN I/F of the mobile terminal 80, using the common use wireless setting. Then, the MFP 10 and the mobile terminal 80 perform communication of target data to be used to execute the particular function indicated by the execution request therebetween via the wireless LAN I/F 20 and the wireless LAN I/F of the mobile terminal 80, using the established wireless communication link (e.g., step S114 in FIG. 6). Details of this communication is also the same as the communication performed in the example depicted in FIG. 8, and therefore, a detailed description for this communication will be omitted.

After the execution of the particular function is completed, the mobile terminal 80 ends the running application for MFP.

Referring to FIG. 10, example communication performed between the MFP 10 and the mobile terminal 50 operating in the P2P mode when the MFP 10 operates in the P2P mode will be described.

In the example depicted in FIG. 10, after the power of the MFP 10 is turned on, the MFP 10 operates in the P2P mode (e.g., NO in step S18, and step S20 in FIG. 2). The MFP 10 monitors establishment of a P2P communication link (e.g., step S110 in FIG. 6).

In the example depicted in FIG. 10, the mobile terminal 50 has the application for MFP already installed thereon. As a function execution instruction (e.g., the scanning instruction or the printing instruction) is inputted via the operation portion after the application for MFP starts, the mobile terminal 50 shifts to a state where the P2P mode is active and the other modes are inactive.

As the mobile terminal 50 is brought closer to the MFP 10 under this situation, a P2P communication link is established between the MFP 10 and the mobile terminal 50 (e.g., YES in step S110 in FIG. 6). Then, P2P communication is performed between the MFP 10 and the mobile terminal 50 using the P2P communication link (e.g., step S112 in FIG. 6). The P2P communication performed in this case is the same as the P2P communication performed in the examples depicted in FIGS. 8 and 9, and therefore, a detailed description for the P2P communication will be omitted.

Through the P2P communication, the wireless setting becomes available for common use in both the MFP 10 and the mobile terminal 50. Similar to the examples depicted in FIGS. 8 and 9, the MFP 10 and the mobile terminal 50 establish a wireless communication link (e.g., a WFD connection or a basic Wi-Fi connection) therebetween via the wireless LAN I/F 20 and the wireless LAN I/F 56, using the common use wireless setting. Then, the MFP 10 and the mobile terminal 50 perform communication of target data to be used to execute the particular function indicated by the execution request therebetween via the wireless LAN I/F 20 and the wireless LAN I/F 56, using the established wireless communication link (e.g., step S114 in FIG. 6). Details of this communication is also the same as the communication performed in the example depicted in FIGS. 8 and 9, and therefore, a detailed description for this communication will be omitted.

After the execution of the particular function is completed, the mobile terminal 50 ends the running application for MFP.

Effects of the illustrative embodiment will be described below. As described with reference to FIG. 2, in the illustrative embodiment, when it is determined that the MFP 10 is in the state where the MFP 10 needs to transmit the URL (e.g., the support page URL, the consumable item URL, or the application download URL) (e.g., when a device error has occurred, when a consumable item error has occurred, or when the application URL provision mode is enabled) (e.g., YES in step S10, YES in step S12, or YES in step S14 in FIG. 2), the MFP 10 is allowed to operate in the CE mode (e.g., in step S24, S28, or S32). As depicted in FIG. 7, when the MFP 10(CE)-mobile terminal 50(R) communication link is established between the MFP 10 operating in the CE mode and the mobile terminal 50 operating in the Reader mode (e.g., YES in step S50 in FIG. 3), the NFC I/F 22 of the MFP 10 transmits the URL to the mobile terminal 50 using the MFP 10(CE)-mobile terminal 50(R) communication link. When it is determined that the MFP 10 is not in the state where the MFP 10 needs to transmit the URL (e.g., NO in step S10, NO in step S12, and NO in step S14 in FIG. 2), the MFP 10 is allowed to operate in one of the operation modes (e.g., the P2P mode, the Writer mode, and the Reader mode) other than the CE mode (e.g., step S20, S38, or S42). The MFP 10 performs an appropriate process in accordance with the operation mode (see FIGS. 7 to 10). That is, the MFP 10 according to the illustrative embodiment may operate in an appropriate operation mode depending on the determination as to whether the MFP 10 is in the state where the MFP 10 needs to transmit the URL. Thus, the MFP 10 may perform appropriate communication with an external device (e.g., one of the mobile terminals 50 and 80 and the identification card 100). Therefore, the MFP 10 according to the illustrative embodiment may operate appropriately in accordance with the state of the MFP 10.

The MFP 10 may be an example of a "communication device". The mobile terminals 50 and 80 may be an example of a "first external device", a "third external device", and/or a "fourth external device". Each of the mobile terminals 50 and 80 and the identification card 100 may be an example of a "second external device". Each of the P2P mode, the Reader mode, and the Writer mode may be an example of a "first mode". Each of the P2P mode and the CE mode may be an example of a "second mode". The URL (e.g., one of the support page URL, the consumable item URL, and the application download URL) may be an example of "pre-stored data". Each of the execution request, the network information of the mobile terminal 50 (80), the wireless setting transmitted by the MFP 10, and the change-unnecessary information transmitted by the MFP 10 may be an example of "first data". The authentication data (see FIG. 9) may be an example of "second data". The writing data (see FIG. 8) may be an example of "third data". Each of the state where a device error has occurred (e.g., YES in step S10 in FIG. 2), the state where a consumable item error has occurred (e.g., YES in step S12 in FIG. 2), and the state where the application URL provision mode is enabled (e.g., YES in step S14 in FIG. 2) may be an example of a "first state". The state where there is a print job (e.g., YES in step S18 in FIG. 2) may be an example of a "second state". The state where there is a writing job (e.g., YES in step S16 in FIG. 2) may be an example of a "third state". The MFP 10(CE)-mobile terminal 50(R) communication link (see FIG. 7) may be an example of a "first type of communication link". Each of the MFP 10(P2P)-mobile terminal 50(P2P) communication link (see FIG. 10), the MFP 10(R)-authentication card(CE) communication link (see FIG. 9), and the MFP(W)-mobile terminal(CE) communication link (see FIG. 8) may be an example of a "second type of communication link". The MFP 10(P2P)-mobile terminal 80(P2P) communication link (see FIGS. 9 and 8) may be an example of a "third type of communication link". The MFP 10(CE)-mobile terminal 80(W) communication link (see FIG. 7) may be an example of a "fourth type of communication link". The MFP 10(P2P)-mobile terminal 50(P2P) communication link (see FIG. 7) may be an example of a "fifth type of communication link". The case where a positive determination (e.g., YES) is made in step S110 in FIG. 6 may be an example of a "first case". The case where a positive determination (e.g., YES) is made in step S90 in FIG. 5 may be an example of a "second case". The case where a positive determination (e.g., YES) is made in step S70 in FIG. 4 may be an example of a "third case".

The processing performed in each of steps S10, S12, and S14 in FIG. 2 may be an example of processing performed by a "first determination portion". The processing performed in step S18 in FIG. 2 may be an example of processing performed by a "second determination portion". The processing performed in step S16 in FIG. 2 may be an example of processing performed by a "third determination portion". The processing performed in each of steps S24, S28, S32, S20, S38, and S42 in FIG. 2 may be an example of processing performed by a "mode setting portion". The processing performed when a positive determination (e.g., YES) is made in step S50 in FIG. 2 may be an example of processing performed by a "transmission portion". The processing performed in each of steps S72 in FIG. 4, S92 in FIG. 5, and S112 in FIG. 6 may be an example of processing performed by a "first communication control portion". The processing performed in each of steps S60 in FIG. 3, step S78 in FIG. 4, and S100 in FIG. 5 may be an example of processing performed by a "changing portion". The processing performed in step S56 in FIG. 3 may be an example of processing performed by a "reception portion". The processing performed in step S112 in FIG. 6 may be an example of processing performed by a "second communication control portion". The processing performed in step S112 in FIG. 6 may be an example of processing performed by a "third communication control portion".

Various embodiments of the disclosure have been described above; however, such embodiments are only examples and do not limit the scope of the appended claims. Examples of the modification and alternations of the above-described embodiment are described below.

In other embodiments, for example, the CPU 30 of the MFP 10 may make a determination in each of steps S10, S12, S14, S16, and S18 in FIG. 2 in order other than the order (e.g., in the order of steps S10, S12, S14, S16, and S18) depicted in FIG. 2. For example, the first determination portion may be configured to determine whether the communication device is in the first state where the communication device needs to transmit, to the outside such as an external destination, the particular data pre-stored in the communication device. The second determination portion may be configured to determine whether the communication device is in the second state that differs from the first state. The third determination portion may be configured to determine whether the communication device is in the third state that differs from the first state.

In other embodiments, for example, the CPU 30 of the MFP 10 may omit one or both of steps S16 and S18 in FIG. 2 so long as the CPU 30 of the MFP 10 performs the determination in each of steps S10, S12, and S14 in FIG. 2. That is, generally speaking, the mode setting portion may be configured to set the operation mode of the communication device to the CE mode of the NFC standard when it is determined that the communication device is in the first state, and to set the operation mode of the communication device to the first mode of the NFC standard that differs from the CE mode when it is determined that the communication device is not in the first state.

In other embodiments, for example, the CPU 30 of the MFP 10 may perform the determination in at least one of steps S10, S12, and S14 in FIG. 2. In this case, the CPU 30 may omit one or more of steps S10, S12, and S14 in FIG. 2. That is, generally speaking, the first determination portion may be configured to determine whether the communication device is in the first state where the communication device needs to transmit, to the outside, the particular data pre-stored in the communication device.

In the illustrative embodiment, when the communication target (e.g., the mobile terminal 50) has already transmitted the execution request to the MFP 10 (e.g., YES in both steps S56 and S58 in FIG. 3), the communication target does not transmit another execution request to the MFP 10 in P2P communication performed in step S112 in FIG. 6. Instead of this, in other embodiments, for example, in P2P communication performed in step S112 of FIG. 6, the communication target may be configured to transmit another execution request to the MFP 10 even when the communication target has already transmitted the execution request to the MFP 10.

The technique by which the CPU 30 of the MFP 10 receives a print job or a writing job is not limited to the technique by which the CPU 30 of the MFP 10 receives the print job or the writing job via the AP 6. In other embodiments, for example, the user may input one of a print job and a writing job directly in the MFP 10 by operating the operation unit 12. In this case, the CPU 30 of the MFP 10 may be configured to store the one of the print job and the writing job inputted through the operation unit 12 in the memory 32. Generally speaking, the "third data" may be obtained by the communication device only.

The "communication device" is not limited to a multifunction device that is configured to perform the printing function and the scanning function (e.g., the MFP 10). In other embodiments, for example, the "communication device" may be a printer that may be configured to perform the printing function only or a scanner that may be configured to perform the scanning function only. The "communication device" may be a device (e.g., a PC, a server, a mobile terminal (e.g., a mobile phone, a smartphone, and a PDA)) that may be configured to perform one or more functions (e.g., an image displaying function or a data calculating function) other than the printing function and the scanning function. That is, the "communication device" may include any device that may be capable of performing communication using the NFC system. The "external device" is also not limited to the mobile terminals 50 and 80 and the identification card 100, but may include any device that may be capable of performing communication using the NFC system.

In the illustrative embodiment, the processing in all steps depicted in FIGS. 2 to 6 is implemented by software (e.g., the program). Nevertheless, in other embodiments, for example, the processing in at least one of the steps is implemented by hardware, for example, a logical circuit.

Further, the technical elements described in the specification and the drawings exhibit technical usability alone or in various combinations, and are not limited to those in the claims at the time of the application of the disclosure. Furthermore, the techniques described as examples in the specification or drawings may achieve a plurality of objects simultaneously, and has technical utility by achieving any one of these objects.

What is claimed is:

1. A communication device comprising:
   a Near Field Communication (NFC) interface configured to perform communication by using an NFC system compliant with an NFC standard; and
   a controller comprising:
      a processor; and
      a memory storing computer-readable instructions, the computer-readable instructions, when executed by the processor, causing the communication device to perform:
         determining whether a state of the communication device is a first state in which data pre-stored in the communication device is to be transmitted to an external destination;
      in a case where the state of the communication device is determined to be the first state:
         setting an operation mode of the communication device to a Card Emulation (CE) mode of the NFC standard;
         establishing a first type of communication link between the communication device and a first external device in a case where the operation mode of the communication device is set to the CE mode, the first type of communication link configured to communicate data using the NFC interface when the communication device operates in the CE mode and the first external device operates in a Reader mode of the NFC standard; and
         transmitting the pre-stored data to the first external device by using the first type of communication link in a case where the first type of communication link is established;
      in a case where the state of the communication device is determined not to be the first state:
         setting the operation mode of the communication device to a first mode of the NFC standard that differs from the CE mode;
         establishing a second type of communication link between the communication device and a second external device in a case where the operation mode of the communication device is set to the first mode, the second type of communication link configured to communicate data using the NFC interface when the communication device operates in the first mode and the second external device operates in a second mode of the NFC standard; and
         communicating communication target data, different from the pre-stored data, with the second external device using the second type of communication link in a case where the second type of communication link is established.

2. The communication device according to claim 1, wherein:
   the first mode includes a Peer-to-Peer (P2P) mode, and
   communicating the communication target data includes performing two-way communication of the communication target data with the second external device in a first case where the second type of communication link is established in a state where the operation mode of the communication device is set to the P2P mode, the second type of communication link configured to communicate data when each of the communication device and the second external device operates in the P2P mode.

3. The communication device according to claim 1, wherein:
   the computer-readable instructions, when executed, further cause the communication device to perform determining whether the state of the communication device is a second state that differs from the first state, the second state being a state in which second data is received from an external source,
   the first mode includes a Reader mode of the NFC standard in a case where the state of the communication device is determined not to be the first state but the second state, and
   communicating the communication target data includes receiving the second data as the communication target data from the second external device in a second case where the second type of communication link is established in a state where the operation mode of the communication device is set to the Reader mode, the second type of communication link configured to communicate data when the communication device operates in the Reader mode and the second external device operates in the CE mode.

4. The communication device according to claim 3, wherein:
   the computer-readable instructions, when executed, further cause the communication device to perform:
      changing the operation mode of the communication device from the Reader mode to a Peer-to-Peer (P2P) mode of the NFC standard in a case where a presence of a third external device operating in the P2P mode is detected within a communication range of the NFC interface in a state where the operation mode of the communication device is set the Reader mode, and
      performing two-way communication with the third external device by using a third type of communication link in a case where the third type of communication link is established between the communication device and the third external device after the operation mode of the communication device is changed from the Reader mode to the P2P mode, the third type of communication link configured to communicate data using the NFC interface when each of the communication device and the third external device operates in the P2P mode.

5. The communication device according to claim 1, wherein:
   the computer-readable instructions, when executed, further cause the communication device to perform determining whether the state of the communication device is a third state that differs from the first state, the third state being a state in which third data obtained by the communication device is transmitted to the external destination or another external destination,
   the first mode includes a Writer mode in a case where the state of the communication device is determined to not be the first state but the third state, and
   communicating the communication target data includes transmitting the third data as the communication target data to the second external device in a third case where the second type of communication link is established in a state where the operation mode of the communication device is set to the Writer mode, the second type of communication link configured to communicate data when the communication device operates in the Writer mode and the second external device operates in the CE mode.

6. The communication device according to claim 5, wherein:
the computer-readable instructions, when executed, further cause the communication device to perform:
changing the operation mode of the communication device from the Writer mode to a Peer-to-Peer (P2P) mode of the NFC standard in a case where a presence of a third external device operating in the P2P mode is detected within a communication range of the NFC interface in a state where the operation mode of the communication device is set to the Writer mode, and
performing two-way communication with the third external device by using a third type of communication link in a case where the third type of communication link is established between the communication device and the third external device after the operation mode of the communication device is changed from the Writer mode to the P2P mode, the third type of communication link configured to communicate data using the NFC interface when each of the communication device and the third external device operates in the P2P mode.

7. The communication device according to claim 1, wherein:
the computer-readable instructions further cause the communication device to perform:
receiving a request for the communication device to perform a particular function, from a fourth external device through a fourth type of communication link a case where the fourth type of communication link is established between the communication device and the fourth external device in a state where the operation mode of the communication device is set the CE mode, the fourth type of communication link configured to communicate data using the NFC interface when the communication device operates in the CE mode and the fourth external device operates in a Writer mode of the NFC standard,
changing the operation mode of the communication device from the CE mode to a Peer-to-Peer (P2P) mode of the NFC standard in a case where the request is received from the fourth external device, and
performing two-way communication with the fourth external device by using a fifth type of communication link in a case where the fifth type of communication link is established between the communication device and the fourth external device after the operation mode of the communication device is changed from the CE mode to the P2P mode, the fifth type of communication link configured to communicate data using the NFC interface when each of the communication device and the fourth external device operates in the P2P mode.

8. The communication device according to claim 1, wherein:
the first state includes a state in which an external device is made to download a particular application program, and
the pre-stored data includes location information from which the external device is to download the particular application program.

9. A non-transitory computer-readable recording medium storing computer-readable instructions, the computer-readable instructions, when executed by a processor of a communication device, causing the communication device to perform:
determining whether a state of the communication device is a first state in which data pre-stored in the communication device is to be transmitted to an external destination;
in a case where the state of the communication device is determined to be the first state:
setting an operation mode of the communication device to a Card Emulation (CE) mode of a Near Field Communication (NFC) standard;
establishing a first type of communication link between the communication device and a first external device in a case where the operation mode of the communication device is set to the CE mode, the first type of communication link configured to communicate data using an NFC interface when the communication device operates in the CE mode and the first external device operates in a Reader mode of the NFC standard; and
transmitting the pre-stored data to the first external device by using the first type of communication link in a case where the first type of communication link is established;
in a case where the state of the communication device is determined not to be the first state:
setting the operation mode of the communication device to a first mode of the NFC standard that differs from the CE mode;
establishing a second type of communication link between the communication device and a second external device in a case where the operation mode of the communication device is set to the first mode, the second type of communication link configured to communicate data using the NFC interface when the communication device operates in the first mode and the second external device operates in a second mode of the NFC standard; and
communicating communication target data that differs from the pre-stored data with the second external device by using the second type of communication link in a case where the second type of communication link is established.

10. A communication device comprising:
a Near Field Communication (NFC) interface configured to perform communication by using an NFC system compliant with an NFC standard; and
a controller comprising:
a processor; and
a memory storing computer-readable instructions, the computer-readable instructions, when executed by the processor, causing the communication device to perform:
determining whether a state of the communication device is a first state in which data pre-stored in the communication device is to be transmitted to an external destination, the first state including an error state in which the communication device is not capable of performing at least one of a plurality of functions, the pre-stored data including location information of a webpage, the webpage providing information for resolving the error state;
setting an operation mode of the communication device to a Card Emulation (CE) mode of the NFC standard in a case where the state of the communication device is determined to be the first state;
transmitting the pre-stored data to a first external device by using a first type of communication link in a case where the first type of communication link is established between the communication device and the first external device in a state where the operation mode of the communication device is set to the CE mode, the first type of communication link configured to communicate data using the NFC interface when the communication device operates in the CE mode and the first external device operates in a Reader mode of the NFC standard;

setting the operation mode of the communication device to a first mode of the NFC standard that differs from the CE mode in a case where the state of the communication device is determined not to be the first state; and communicating communication target data, different from the pre-stored data, with a second external device using a second type of communication link in a case where the second type of communication link is established between the communication device and the second external device in a state where the operation mode of the communication device is set to the first mode, the second type of communication link configured to communicate data using the NFC interface when the communication device operates in the first mode and the second external device operates in a second mode of the NFC standard.

11. The communication device according to claim 1, wherein determining whether the state of the communication device is the first state in which data pre-stored in the communication device is to be transmitted to an external destination includes determining whether a data provision setting of the communication device is set to an ON value.

* * * * *